United States Patent
Braido et al.

(10) Patent No.: US 12,471,996 B2
(45) Date of Patent: Nov. 18, 2025

(54) EXTENDED INTELLIGENCE FOR PULMONARY PROCEDURES

(71) Applicant: Medtronic, Inc., Minneapolis, MN (US)

(72) Inventors: Peter N. Braido, Linwood, MN (US); Randal C. Schulhauser, Phoenix, AZ (US); Paul S. Addison, Edinburgh (GB); Max L. Balter, Boston, MA (US); Joseph D. Brannan, Lyons, CO (US); Zhongping Yang, Woodbury, MN (US); Shantanu Sarkar, Roseville, MN (US); Nicolas Coulombe, Anjou (CA)

(73) Assignee: Medtronic, Inc., Minneapolis, MN (US)

( * ) Notice: Subject to any disclaimer, the term of this patent is extended or adjusted under 35 U.S.C. 154(b) by 127 days.

(21) Appl. No.: 17/974,689

(22) Filed: Oct. 27, 2022

(65) Prior Publication Data

US 2023/0157757 A1    May 25, 2023

Related U.S. Application Data

(60) Provisional application No. 63/282,252, filed on Nov. 23, 2021.

(51) Int. Cl.
*A61B 34/10* (2016.01)
*A61B 17/00* (2006.01)
(Continued)

(52) U.S. Cl.
CPC ............ *A61B 34/10* (2016.02); *G06T 19/003* (2013.01); *G06T 19/006* (2013.01);
(Continued)

(58) Field of Classification Search
CPC .............. A61B 34/10; A61B 2034/104; A61B 2034/105; A61B 2017/00216;
(Continued)

(56) References Cited

U.S. PATENT DOCUMENTS 11,005,661 B1 * 5/2021 Neumann ................ G06N 3/08
11,037,679 B1 * 6/2021 Neumann .............. G06V 40/70
(Continued)

OTHER PUBLICATIONS

Gould et al—Evaluation of Individuals With Pulmonary Nodules—When is it Lung Cancer—2013—chestnet (Year: 2013).*
(Continued)

*Primary Examiner* — YuJang Tswei
(74) *Attorney, Agent, or Firm* — Michael Best & Friedrich LLP

(57) ABSTRACT

Novel tools and techniques are provided for implementing intelligent assistance ("IA") or extended intelligence ("EI") ecosystem for pulmonary procedures. In various embodiments, a computing system might analyze received one or more first layer input data (i.e., room content-based data) and received one or more second layer input data (i.e., patient and/or tool-based data), and might generate one or more recommendations for guiding a medical professional in guiding a surgical device(s) toward and within a lung of the patient to perform a pulmonary procedure, based at least in part on the analysis, the generated one or more recommendations comprising 3D or 4D mapped guides toward, in, and around the lung of the patient. The computing system might then generate one or more XR images, based at least in part on the generated one or more recommendations, and might present the generated one or more XR images using a UX device.

18 Claims, 17 Drawing Sheets

(51) Int. Cl.
*A61B 34/20* (2016.01)
*G06N 20/00* (2019.01)
*G06T 19/00* (2011.01)

(52) U.S. Cl.
CPC ............... *A61B 2017/00216* (2013.01); *A61B 2017/00809* (2013.01); *A61B 2034/104* (2016.02); *A61B 2034/105* (2016.02); *A61B 2034/107* (2016.02); *A61B 34/20* (2016.02); *A61B 2034/2048* (2016.02); *A61B 2034/2051* (2016.02); *A61B 2034/2055* (2016.02); *A61B 2034/2063* (2016.02); *A61B 2034/2065* (2016.02); *G06N 20/00* (2019.01); *G06T 2210/41* (2013.01)

(58) Field of Classification Search
CPC .... A61B 2017/00809; A61B 2034/107; A61B 2034/2048; A61B 2034/2055; G06T 19/003; G06T 19/006; G06T 2210/41; G16H 20/40; G16H 30/40; G16H 40/63; G16H 40/67; G16H 50/20
See application file for complete search history.

(56) References Cited

U.S. PATENT DOCUMENTS

| | | | | |
|---|---|---|---|---|
| 11,207,133 | B1* | 12/2021 | Douglas | G06T 19/20 |
| 11,217,033 | B1* | 1/2022 | Morgan | G16H 40/67 |
| 11,270,789 | B1* | 3/2022 | Neumann | G16H 50/20 |
| 2017/0258526 | A1* | 9/2017 | Lang | A61B 17/157 |
| 2018/0350010 | A1* | 12/2018 | Kuper | G06N 20/00 |
| 2020/0138518 | A1* | 5/2020 | Lang | A61B 90/37 |
| 2020/0321123 | A1* | 10/2020 | Neumann | G06N 20/20 |
| 2021/0137634 | A1* | 5/2021 | Lang | A61B 5/113 |
| 2021/0192759 | A1* | 6/2021 | Lang | A61B 34/20 |
| 2021/0287783 | A1* | 9/2021 | Jhaveri | G16H 80/00 |
| 2021/0290284 | A1* | 9/2021 | Guggenberger | A61B 18/02 |
| 2021/0369393 | A1 | 12/2021 | Braido et al. | |
| 2021/0369394 | A1* | 12/2021 | Braido | A61B 8/0883 |
| 2022/0029986 | A1* | 1/2022 | Neumann | G16H 80/00 |
| 2022/0167929 | A1* | 6/2022 | Neumann | G16H 10/20 |
| 2023/0057317 | A1* | 2/2023 | Kadidal | G06F 3/0482 |
| 2023/0143522 | A1* | 5/2023 | Keast | A61B 34/20 606/130 |

OTHER PUBLICATIONS

Li et al—Augmented reality navigation-guided pulmonary nodule localization in a canine model—Oct. 20, 2021—Translational Lung Cancer Research (Year: 2021).*
Avitall et al characteristics of ice impedance recorded from a ring electrode placed at the anterior surface of the Cryoballoon—2018—Circ Arrhythm Electrophysiol (Year: 2018).*
Giaretto et al Mirror image technique for the thermal analysis in cryoablation 2017 Elsevier (Year: 2017).*
Giaretto et al thermodynamic properties of atrial fibrillation cryoablation a model based approach to improve knowledge on energy delivery 2019 Interface (Year: 2019).*
Mazur—freezing of living cells mechanisms and implications—1984—American Physiological Society (Year: 1984).*

* cited by examiner

600

600

SIGNS AND SYMPTOMS: RESPIRATORY CONDITIONS

| CHF Decompensation | COPD Exacerbation |
|---|---|
| • Dyspnea (difficulty breathing)<br>• Increased respiration rate<br>• Elevated filling pressure (Jugular venous distention, PA Wedge Pressure, S3 heart sound)<br>• Edema/tissue fluid<br>• Increase HR, Decrease HRV<br>• Decrease pO2/SaO2<br>• Crackles/Rales lung sounds<br>• Cough with white or pink tinged phlegm<br>• Elevated BNP<br>• No fever | • Dyspnea (difficulty breathing)<br>• Increased respiration rate<br>• Increased exertion on exhalation (versus inhalation)<br>   • Decrease in peak expiratory flow<br>   • Exhale time/inhale time increases<br>• Rhonchi (low pitched, rattling lung sounds)<br>• Increase HR<br>• Decrease pO2/SaO2, Increase in pCO2<br>• Increase in cough rate<br>• Purulent phlegm<br>• No or low grade fever |
| Pneumonia | Asthma |
| • Dyspnea (difficulty breathing)<br>• Increased respiration rate<br>• Decrease pO2/SaO2<br>• Crackles/Rales lung sounds (may be unilateral)<br>• Cough with purulent phlegm<br>• Elevated BNP<br>• High fever (>38.5°C) | • Dyspnea (difficulty breathing)<br>• Increased respiration rate<br>• Inhalation and exhalation are both difficult<br>• O2 may drop more than for other conditions<br>• Wheezing lung sounds<br>• No fever<br>• Responds quickly to bronchodilator |

LINQ-HF PRELIMINARY DATA
RESPIRATION FROM IMPEDANCE

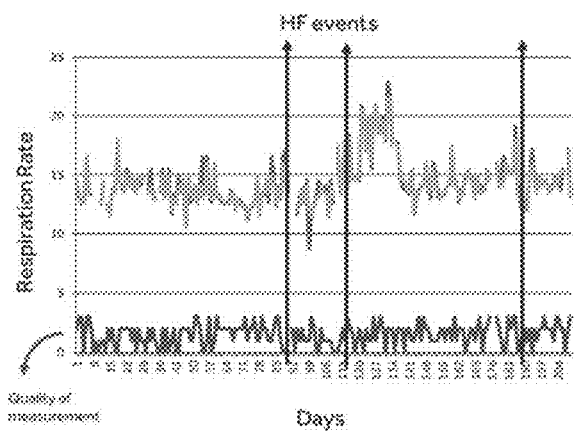
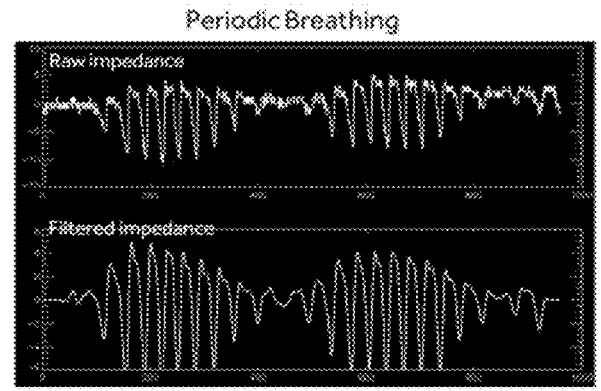

DIFFERENTIAL DIAGNOSIS FOR RESPIRATORY CONDITIONS

600

600

600

600

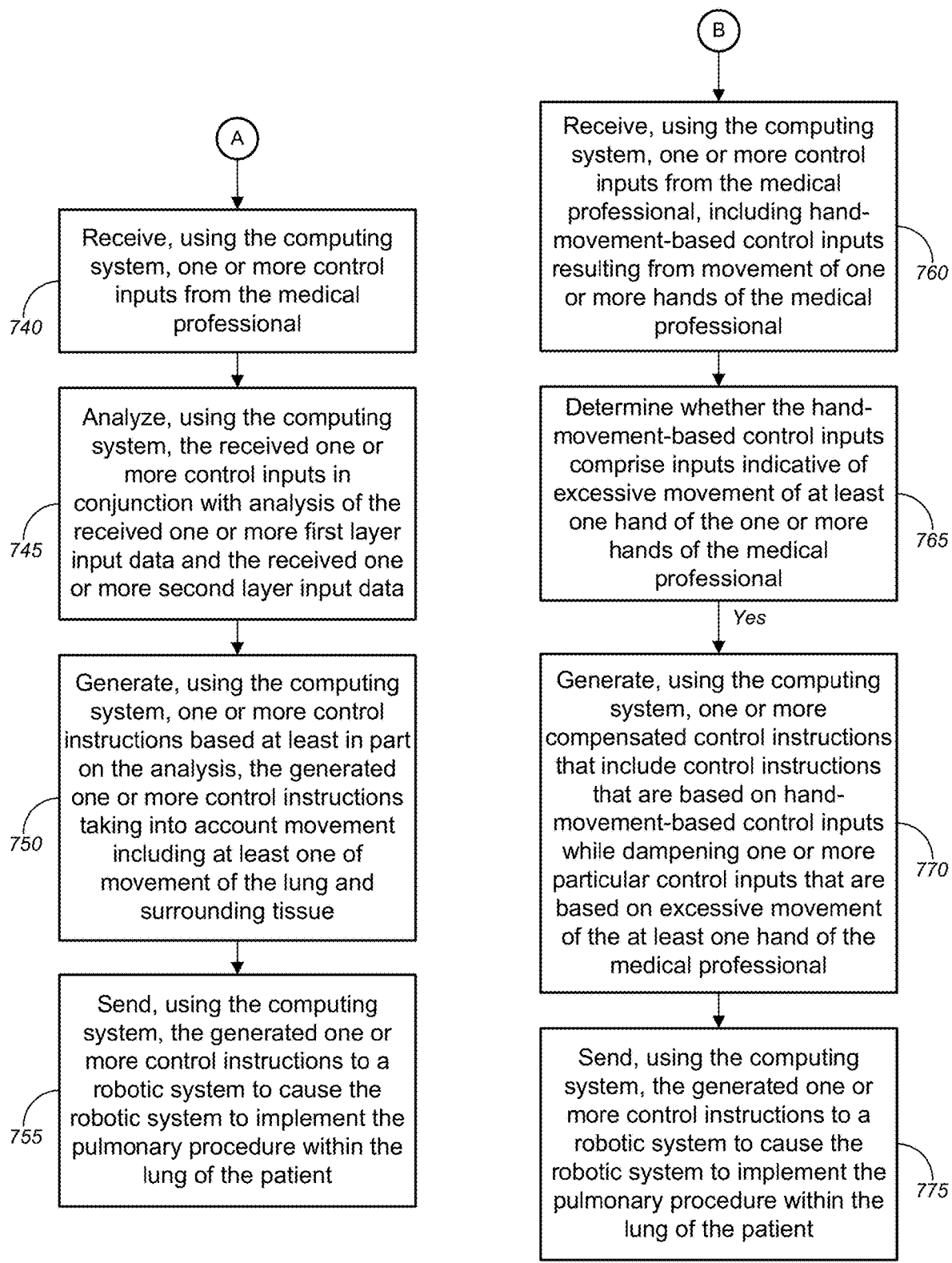

EXTENDED INTELLIGENCE FOR PULMONARY PROCEDURES

CROSS-REFERENCE TO RELATED APPLICATIONS

This application claims priority to U.S. Patent Application Ser. No. 63/282,252 (the "'252 application"), filed Nov. 23, 2021, by Peter N. Braido et al., entitled, "Extended Intelligence for Pulmonary Procedures," the disclosure of which is incorporated herein by reference in its entirety for all purposes.

This application may be related to each of U.S. Patent Application Ser. No. 63/032,278 (the "'278 application"), filed May 29, 2020 by Peter N. Braido et al., entitled, "Intelligent Assistance (IA) Ecosystem," U.S. Patent Application Ser. No. 63/032,283 (the "'283 application"), filed May 29, 2020 by Peter N. Braido et al., entitled, "Extended Reality (XR) Applications for Cardiac Arrhythmia Procedures," U.S. Patent Application Ser. No. 63/032,289 (the "'289 application"), filed May 29, 2020 by Peter N. Braido et al., entitled, "Extended Reality (XR) Applications for Cardiac Blood Flow Procedures," and U.S. Patent Application Ser. No. 63/058,632 (the "'632 application"), filed Jul. 30, 2020 by Peter Braido et al., entitled, "Extended Reality (XR) Applications for Cardiac Shunting Procedures," the disclosure of each of which is incorporated herein by reference in its entirety for all purposes. This application may also be related to U.S. patent application Ser. No. 17/334,487 (the "'487 application"), filed May 28, 2021 by Peter N. Braido et al., entitled, "Intelligent Assistance (IA) Ecosystem," which claims priority to the '278, '283, '289, and '632 applications, the disclosure of each of which is incorporated herein by reference in its entirety for all purposes. This application may also be related to U.S. Patent Application Ser. No. 63/187,738 (the "'738 application"), filed May 12, 2021 by Peter N. Braido et al., entitled, "Extended Intelligence for Cardiac Implantable Electronic Device (CIED) Placement Procedures," the disclosure of which is incorporated herein by reference in its entirety for all purposes.

The respective disclosures of these applications/patents (which this document refers to collectively as the "Related Applications") are incorporated herein by reference in their entirety for all purposes.

FIELD

The present disclosure relates, in general, to methods, systems, and apparatuses for implementing medical assistance technologies, and, more particularly, to methods, systems, and apparatuses for implementing intelligent assistance ("IA") or extended intelligence ("EI") ecosystem, and even more particularly, to methods, systems, and apparatuses for implementing extended intelligence for pulmonary procedures.

BACKGROUND

Today, there are many untreated patients with pulmonary disorders, including, but not limited to, chronic obstructive pulmonary disease ("COPD"). COPD refers to a group of diseases that cause chronic and persistent airflow limitation or blockage that is progressive and interferes with normal breathing. People with even mild or moderate COPD have trouble with daily and physical activities, thus affecting home and work life. In a number of severe cases, COPD also leads to death, and is in fact a leading cause of death and a significant burden on the healthcare system. For example, it is estimated that approximately 29 million adults in the United States and approximately 300 million people worldwide have COPD. It is currently the fourth leading cause of death in the U.S. and the third leading cause of death worldwide, with an estimated annual healthcare burden of about US$50 Billion in the U.S. and about EU€ 50 Billion in Europe.

One treatment for COPD is a targeted lung denervation procedure, in which pulmonary nerve input to the lung is disrupted to reduce clinical consequences of neural hyperactivity. Denervation of the lung interrupts vagus nerve signaling to and from the lung, which results in a decrease in basal parasympathetic tone throughout the lung that supports bronchodilation through relaxation of smooth muscle and through decrease in mucous secretion of airway submucosal glands. By attenuating neural activity in this manner, exacerbations and symptoms may be decreased.

In a minimally invasive COPD denervation procedure, a catheter is passed through a bronchoscope in order to complete a full circumferential ablation in the mainstem bronchus of each lung. The bronchoscope is inserted into the mainstem bronchi and a radio-opaque esophageal balloon is inserted to facilitate visualization and avoidance of treatment in close proximity to the esophagus. This procedure (and many similar pulmonary procedures) has many limitations, including, but not limited to, a surgeon or other medical professional having to perform the COPD operation or procedure by hand or using (then up-to-date) surgical tools and instruments, with any imaging and mapping of the progress of the operation or procedure being divorced from or otherwise separate from use of the surgical tools and instruments. This leads to significant effort on the medical professional to fully grasp the situation while juggling the difficulties of the operation or procedure itself, which may lead to complications or issues during the operation or procedure, particularly for complex ones. In some cases, this may also lead to cognitive overload for the medical professional, as well as the medical professional literally not having enough hands to operate all the tools. Other disadvantages or issues with traditional techniques include imaging data lacking in information that the physician needs for 3D positioning of the catheter for COPD or other pulmonary procedures, lack of compensation for respiration of the patient and beating heart as well as excessive hand movements of the physician (among other causes of movement), adverse events caused by inaccurate placement of the catheter, and/or the like.

More recently, the use of augmented reality or mixed reality to aid in the medical professional during operations or procedures has led to improvements in the system, allowing for more successful outcomes to the operations or procedures. Such recent developments, however, do not fully implement compilation of surgical tool or instrument data, imaging data, and patient data, or integrate the compilation of such data with data analytics and artificial intelligence ("AI") or machine learning or deep learning, and with an intuitive extended reality ("XR") implementation, and, in some cases, also with interfacing robotics to achieve an intelligent assistance ("IA") or extended intelligence ("EI") ecosystem as described in detail below.

Hence, there is a need for more robust and scalable solutions for implementing medical assistance technologies, and, more particularly, to methods, systems, and apparatuses for implementing IA or EI ecosystem, and even more particularly, to methods, systems, and apparatuses for implementing extended intelligence for pulmonary procedures.

SUMMARY

The techniques of this disclosure generally relate to tools and techniques for implementing medical assistance technologies, and, more particularly, to methods, systems, and apparatuses for implementing IA or EI ecosystem, and even more particularly, to methods, systems, and apparatuses for implementing extended intelligence for pulmonary procedures.

In an aspect, a method may comprise receiving, using a computing system, one or more first layer input data from one or more first devices, the one or more first layer input data comprising at least one of movement data, position data, relative distance data, or externally observable data for each of one or more persons and one or more objects within a room; and receiving, using the computing system, one or more second layer input data from one or more second devices, the one or more second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient. The method may also comprise analyzing, using the computing system, the received one or more first layer input data and the received one or more second layer input; and generating, using the computing system, one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient. The method may further comprise generating, using the computing system, one or more extended reality ("XR") images, based at least in part on the generated one or more recommendations; and presenting, using the computing system and using a user experience ("UX") device, the generated one or more XR images.

In some embodiments, the computing system may comprise at least one of an XR computing system, a medical procedure computing system, a hub computing system, a 3D graphical processing unit, a cluster computing system, a 4D graphics computing system, a server computer, a cloud computing system, or a distributed computing system, and/or the like.

According to some embodiments, the one or more surgical devices may comprise at least one of one or more catheters, one or more catheter interconnect cables, one or more balloons, one or more rigid robotic devices, one or more soft robotic devices, one or more robotic systems, one or more robotic arms, one or more needles, one or more therapeutic delivery devices, one or more diagnostic devices, one or more diagnostic catheters, one or more bronchoscopes, one or more surgical tools, one or more drug pumps, one or more delivery pharmaceuticals, one or more biopsy tools, one or more excision tools, one or more ablation tools, one or more monitoring devices, one or more cameras, one or more imaging tools, one or more fiducials, one or more staples, one or more anchors, one or more lasers, one or more guide wires, one or more introducers, one or more sheaths, one or more pillcams, one or more clips, one or more capsules, one or more energy delivery tools, a catheter electrode distribution system ("CEDS"), a pulsed field ablation ("PFA") system, a PFA console, an electroporation system, an electroporation control console, a cryoballoon or a cryoablation catheter, a cryoablation console, a radio frequency ("RF") ablation-based system, an RF ablation control console, a laser ablation-based system, a laser ablation control console, a radiation ablation-based system, a radiation ablation control console, a microwave ablation-based system, a chemical ablation-based system, a loop catheter, a hoop catheter, a circular catheter, an RF catheter, a phased RF catheter, a high intensity focused ultrasound ("HIFU") system, a HIFU control console, or one or more capital equipment, and/or the like.

In some embodiments, the one or more patient sensor data may be obtained using one or more sensors comprising at least one of one or more chronically implanted sensors, one or more diagnostic sensors, one or more surgical sensors, one or more wearable sensors, one or more gas sensors, one or more optical sensors, one or more impedance sensors, one or more ultrasound sensors, one or more flow sensors, one or more blood velocity sensors, one or more blood volume sensors, one or more motion sensors, one or more sound sensors, one or more blood pressure sensors, one or more heart rate sensors, one or more pulse sensors, one or more oxygen sensors, one or more pulse oximetry sensors, one or more carbon dioxide ("$CO_2$") sensors, one or more fluid levels, one or more lung volume sensors, one or more respiration rate sensors, one or more tidal volume sensors, one or more lung filling pressure sensors, one or more piezoelectric sensors, one or more accelerometers, one or more image sensors, one or more acoustic sensors, one or more temperature sensors, one or more ambulatory activity monitoring sensors, one or more patient weight sensors, one or more patient mattress sensors, one or more doppler sensors, one or more biomarker sensors, one or more perfusion sensors, one or more electromyography ("EMG") sensors, one or more electrocardiography ("ECG") sensors, one or more sleep sensors, one or more hematocrit ("HCT") level sensors, one or more biometric sensors, one or more electroencephalographic ("EEG") sensors, one or more apnea monitoring sensors, one or more dyspnea monitoring sensors, one or more nociception monitoring sensors, or one or more pain sensors, and/or the like.

According to some embodiments, the one or more patient imaging data may be obtained using one or more imaging devices comprising at least one of a magnetic resonance imaging ("MM") system, a diffusion-tensor imaging ("DTI") system, a computed tomography ("CT") system, an ultrasound ("US") system, a transesophageal echocardiography ("TEE") system, an intra-cardiac echocardiography ("ICE") system, a transthoracic echocardiography ("TTE") system, an intravascular ultrasound ("IVUS") system, an electromechanical wave imaging ("EWI") system, a neuro-endoscopy system, a single photon emission computed tomography ("SPECT") system, a magnetic resonance angiography ("MRA") system, a computed tomography angiography ("CTA") system, a blood oxygen-level dependent signal ("BOLD") system, an arterial spin labeling ("ASL") system, a magnetoencephalography ("MEG") system, a positron emission tomography ("PET") system, an electroencephalography ("EEG") system, an optical coherence tomography ("OCT") system, an optical imaging spectroscopy ("OIS") system, a magnetic resonance spectroscopy ("MRS") system, a dynamic susceptibility contrast ("DSC") MRI system, a fluid-attenuated inversion recovery ("FLAIR") system, a fluoroscopy system, an X-ray system, a 3D scanning system, an infrared ("IR") system, an ultraviolet ("UV") system, a bioluminescent system, an endoscopy system, a triboluminescence system, an image fusion system, or a microscope, and/or the like.

In some instances, the pulmonary procedure may comprise at least one of a bronchoscopy procedure, a lung tissue denervation procedure, a lung tissue biopsy procedure, a chronic obstructive pulmonary disease ("COPD") diagnosis procedure, a dyspnea diagnosis procedure, a pneumonia diagnosis procedure, an asthma diagnosis procedure, a long-term corona virus diagnosis procedure, an anaphylactic response diagnosis procedure, a bronchitis diagnosis procedure, a lung cancer diagnosis procedure, a COPD treatment procedure, a dyspnea treatment procedure, a pneumonia treatment procedure, an asthma treatment procedure, a long-term corona virus treatment procedure, an anaphylactic response treatment procedure, a bronchitis treatment procedure, or a lung cancer treatment procedure, and/or the like.

In some cases, the one or more XR images may comprise at least one of one or more augmented reality ("AR") images, one or more AR videos, one or more virtual reality ("VR") images, one or more VR videos, one or more mixed reality ("MR") images, one or more MR videos, one or more XR images, or one or more XR videos, and/or the like.

In some embodiments, the UX device may comprise at least one of a headset, UX glasses, a viewing window, a supplement to existing glasses, headphones, UX contact lenses, a heads-up display ("HUD") device, a 3D spatial sound system, a telemonitoring system, a rigid robotic device control and sensory feedback system, a soft robotic device control and sensory feedback system, an eye control system, a voice control system, a remote control system, a gesture-based control system, a sign language-based control system, a body-part-based control system, a joystick, a mouse, a two-dimensional ("2D") screen display, a 3D refractive display, a parallel reality system, a projection system, a 3D printed reconstruction system, a customized view generation system, a ghosting and prediction system, a master-slave control system, an annotation system, or a haptic feedback system, and/or the like.

In some instances, the generated one or more XR images may be presented to provide one or more of: a guide for the medical professional, a navigation tool during the pulmonary procedure, a proximity detection tool during the pulmonary procedure, a 3D or 4D visualization view of the at least one or more portions of the patient, a heads-up display of at least one of the one or more first layer input data, a heads-up display of at least one of the one or more patient sensor data, a heads-up display of at least one of the one or more patient imaging data, a heads-up display of physiological data of the patient, or a heads-up display of procedure-related data of the patient, and/or the like.

According to some embodiments, the method may further comprise tracking, using the computing system, the one or more surgical devices, using at least one of an electromagnetic-based tracking system, a magnetic anomaly detection-based tracking system, a radio frequency identification ("RFID")-based tracking system, a Bluetooth-based tracking system, a wireless-based tracking system, an optical-based tracking system, a laser-based tracking system, an ultrasound ("US") imaging-based tracking system, a computer vision-based tracking system, a fluoroscopy-based tracking system, an MRI-based tracking system, an accelerometer-based tracking system, a global positioning system ("GPS")-based tracking system, an infrared ("IR")-based tracking system, an ultrasonic sound-based tracking system, a piezoelectric-based tracking system, a simultaneous localization and mapping ("SLAM")-based tracking system, an acoustic-based tracking system, a radar-based tracking system, a feature identification-based tracking system, a machine learning-based tracking system, a predictive tracking system, a prescriptive tracking system, or a near-field communications-based tracking system, and/or the like.

In some embodiments, the method may further comprise receiving, using the computing system, one or more control inputs from the medical professional; analyzing, using the computing system, the received one or more control inputs in conjunction with analysis of the received one or more first layer input data and the received one or more second layer input data; generating, using the computing system, one or more control instructions based at least in part on the analysis, the generated one or more control instructions taking into account movement including at least one of movement of the lung and surrounding tissue due to at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient, and/or the like; and sending, using the computing system, the generated one or more control instructions to the robotic system to cause the robotic system to implement the pulmonary procedure within the lung of the patient.

In some cases, at least the processes of receiving the one or more first layer input data, receiving the one or more second layer input data, analyzing the received one or more first layer input data and the received one or more second layer input, generating the one or more recommendations, generating the one or more XR images, presenting the generated one or more XR images, receiving the one or more control inputs, analyzing the received one or more control inputs, generating the one or more control instructions, and sending the generated one or more control instructions may occur in a manner that is at least one of continual, dynamic, feedback-looped, updated, in real-time, or in near-real-time, and/or the like, during the course of the pulmonary procedure.

Alternatively, or additionally, the received one or more control inputs may comprise hand-movement-based control inputs resulting from movement of one or more hands of the medical professional, wherein analyzing the received one or more control inputs may comprise determining whether the hand-movement-based control inputs comprise inputs indicative of excessive movement of at least one hand of the one or more hands of the medical professional, and wherein generating the one or more control instructions may comprise, based on a determination that the hand-movement-based control inputs comprise inputs indicative of excessive movement of at least one hand of the medical professional, generating, using the computing system, one or more compensated control instructions that include control instructions that are based on hand-movement-based control inputs while dampening one or more particular control inputs that are based on excessive movement of the at least one hand of the medical professional.

According to some embodiments, the method may be performed without use of fluoroscopy.

In some embodiments, the one or more surgical devices may comprise an ablation catheter, and the method may further comprise: tracking, using the computing system, the ablation catheter as the ablation catheter is navigated within the body of the patient toward the lung of the patient; presenting, using the computing system and using the UX device, the generated one or more XR images to guide, in real-time or near-real-time, the medical professional in positioning the ablation catheter within one or more predetermined targeted locations within the lung, which is in motion due to expected pulmonary activity; and presenting, using the computing system and using the UX device, the generated one or more XR images to highlight, in real-time or near-real-time, at least one of all portions of the lung that have been ablated by the ablation catheter, one or more target locations in the lung that are yet to be ablated by the ablation catheter, one or more guided paths or trajectories toward each of the one or more target locations, or one or more portions of the lung or other organ structures to avoid, and/or the like. In some instances, navigating the ablation catheter within the body of the patient may be performed using one or more robotic systems controlled by one or more control inputs received from the medical professional via the computing system.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive one or more first layer input data from one or more first devices, the one or more first layer input data comprising at least one of movement data, position data, relative distance data, or externally observable data for each of one or more persons and one or more objects within a room; receive one or more second layer input data from one or more second devices, the one or more second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient; analyze the received one or more first layer input data and the received one or more second layer input; generate one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient; generate one or more extended reality ("XR") images, based at least in part on the generated one or more recommendations; and present, using a user experience ("UX") device, the generated one or more XR images.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive one or more first layer input data from one or more first devices, the one or more first layer input data comprising at least one of movement data, position data, relative distance data, or externally observable data for each of one or more persons and one or more objects within a room; receive one or more second layer input data from one or more second devices, the one or more second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient; analyze the received one or more first layer input data and the received one or more second layer input; generate one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient; generate one or more extended reality ("XR") images, based at least in part on the generated one or more recommendations; and present, using a user experience ("UX") device, the generated one or more XR images.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

"intra-operative adjustments," and "post-operative monitoring" with an optimization feedback loop, in accordance with various embodiments.

FIGS. 6A-6K are diagrams illustrating non-limiting examples of sensors, respiratory conditions, lung analyzers, trajectory of a surgical device within a lung, and robotics for controlling positioning of the surgical device within the lung that may be part of implementation of an IA or EI ecosystem for pulmonary procedures, in accordance with various embodiments.

FIGS. 7A-7D are flow diagrams illustrating a method for implementing an IA or EI ecosystem for pulmonary procedures, in accordance with various embodiments.

Figure 8:
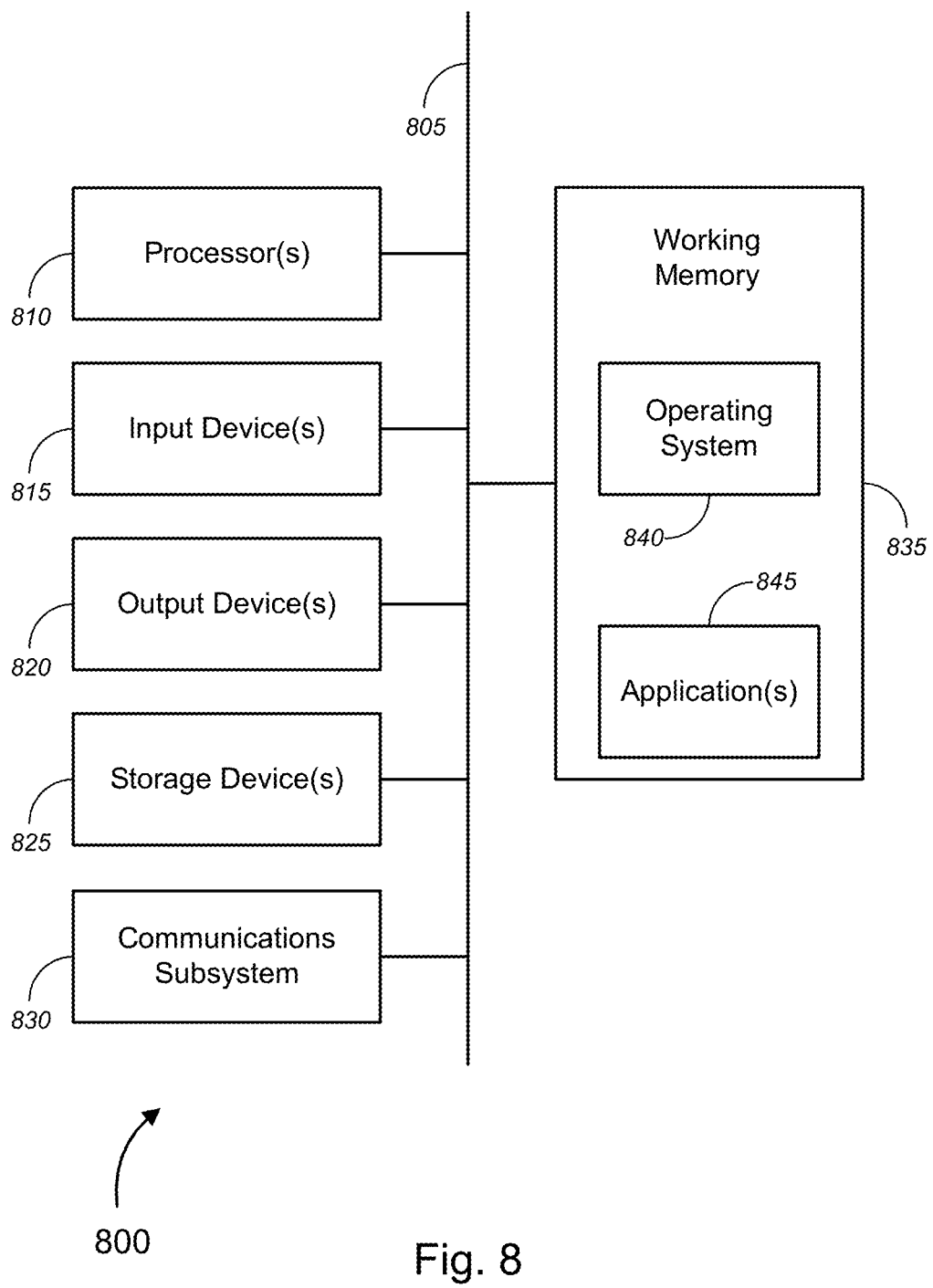

FIG. 8 is a block diagram illustrating an exemplary computer or system hardware architecture, in accordance with various embodiments.

Figure 9:
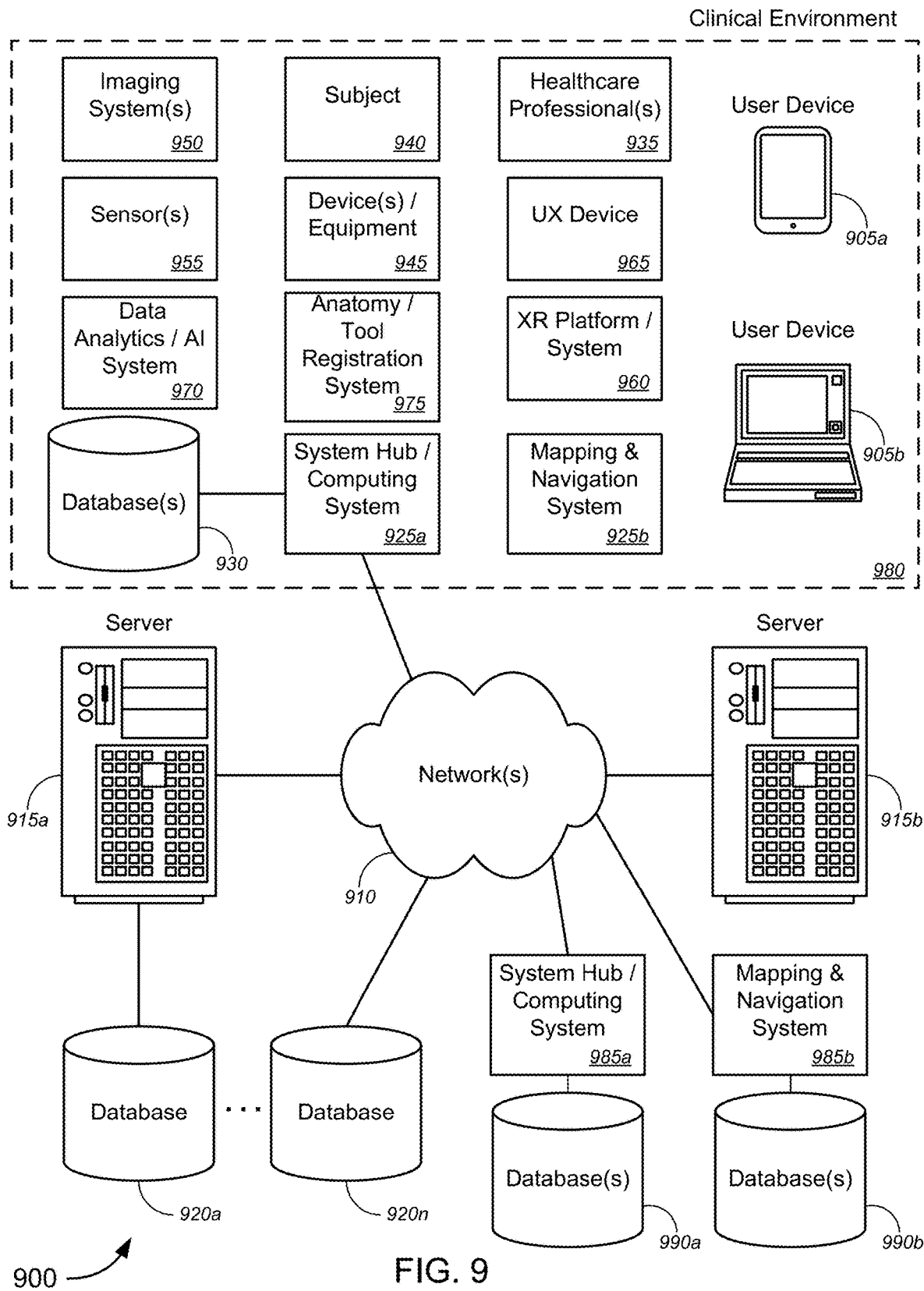

FIG. 9 is a block diagram illustrating a networked system of computers, computing systems, or system hardware architecture, which can be used in accordance with various embodiments.

DETAILED DESCRIPTION OF CERTAIN EMBODIMENTS

Overview

In various embodiments, a computing system might receive one or more first layer input data from one or more first devices, the one or more first layer input data comprising at least one of movement data, position data, relative distance data, or externally observable data for each of one or more persons and one or more objects within a room. The computing system might receive one or more second layer input data from one or more second devices, the one or more second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient, and/or the like.

The computing system might analyze the received one or more first layer input data and the received one or more second layer input, and might generate one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient. The computing system might then generate one or more XR images (or one or more XR experiences), based at least in part on the generated one or more recommendations, and might present the generated one or more XR images (or one or more XR experiences) using a UX device.

According to some embodiments, the generated one or more XR images might be presented to provide one or more of: a guide for a medical professional, a navigation tool during the pulmonary procedure, a proximity detection tool during the pulmonary procedure, a 3D or 4D visualization view of the at least one or more portions of the patient, a heads-up display of at least one of the one or more first layer input data, a heads-up display of at least one of the one or more patient sensor data, a heads-up display of at least one of the one or more patient imaging data, a heads-up display of physiological data of the patient, or a heads-up display of procedure-related data of the patient, and/or the like. In some instances, generating the one or more XR images might comprise combining or mapping the received one or more first layer input data and the received one or more second layer input into a combined 3D or 4D representation, based at least in part on the analysis and the generated one or more recommendations; and generating the one or more XR images based on the combined 3D or 4D representation.

According to some embodiments, the computing system might receive one or more control inputs from the medical professional; might analyze the received one or more control inputs in conjunction with analysis of the received one or more first layer input data and the received one or more second layer input data; might generate one or more control instructions based at least in part on the analysis, the generated one or more control instructions taking into account movement including at least one of movement of the lung and surrounding tissue due to at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient, and/or the like; and might send the generated one or more control instructions to the robotic system to cause the robotic system to implement the pulmonary procedure within the lung of the patient.

In some instances, at least the processes of receiving the one or more first layer input data, receiving the one or more second layer input data, analyzing the received one or more first layer input data and the received one or more second layer input, generating the one or more recommendations, generating the one or more XR images, presenting the generated one or more XR images, receiving the one or more control inputs, analyzing the received one or more control inputs, generating the one or more control instructions, and/or sending the generated one or more control instructions may occur in a manner that is at least one of continual, dynamic, feedback-looped, updated, in real-time, or in near-real-time, and/or the like, during the course of the pulmonary procedure.

In some embodiments, the received one or more control inputs may comprise hand-movement-based control inputs resulting from movement of one or more hands of the medical professional. In such cases, analyzing the received one or more control inputs may comprise determining whether the hand-movement-based control inputs comprise inputs indicative of excessive movement of at least one hand of the one or more hands of the medical professional. As such, generating the one or more control instructions may comprise, based on a determination that the hand-movement-based control inputs comprise inputs indicative of excessive movement of at least one hand of the medical professional, the computing system generating one or more compensated control instructions that include control instructions that are based on hand-movement-based control inputs while dampening one or more particular control inputs that are based on excessive movement of the at least one hand of the medical professional.

In various aspects, decision support systems (i.e., Extended Intelligence or EI systems) are supporting clinicians at an ever-increasing rate, which has been bolstered by advances in machine learning, contactless sensors, robotics, and extended reality (among other parts of the ecosystem as shown and described with respect to the figures). These decision support systems enable seamless integration of the complex workflows, equipment, and devices so augmented clinical decision-making affords the patient with safer, more efficacious, consistent, and timely outcomes.

Most physical workspaces are sensitive and responsive to the non-contact and contact interactions between humans and the medical equipment in such workspaces, so by gathering this data without interfering with the workflow via contactless sensors, analyzing via machine learning algorithms, then displaying what is needed at the right time and place via extended reality systems (at least in part) will avoid medical staff cognitive overload, inefficiencies, and suboptimal outcomes (i.e., inaccurate or imprecise positioning of catheters for implementing pulmonary procedures), or the like. The IA or EI ecosystem may also compensate for at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient, as well as excessive movement of the user or physician, while reducing or eliminating the use of fluoroscopy.

These and other aspects of the extended intelligence for pulmonary procedures are described in greater detail with respect to the figures. With respect to these pulmonary procedures, the EI ecosystem provides one or more of the following features: (1) moving the display screen to XR viewing of placement and windows in an ergonomic location not looking away from the patient or preferred field of view; (2) overlaying CT information on the patient or preferred field of view in 3D with EM navigation and/or optical view in real time; (3) identifying adjacent structures and lung movement via sensor, imaging, and/or FEA/CFD algorithms; (4) adding trajectory bounds from pre-op planning manually or via feedback loop from post-op database; (5) providing real time 3D visual feedback in the form of distance to target, audible beeps, color gradation, haptic shake of handles, etc.; (6) providing contact highlighting and ablation tagging in 3D with embedded meta data in such locations in 3D coordinates, ablation metrics like power, time to target, proximity to adjacent structures, etc.; (7) recording the above for post-op assessment and playback manually, and linking to acute and chronic outcomes to build the virtuous loop of AI infrastructure; (8) employing multiple EM coils with catheter mechanical properties to interpolate the visualization of the entire catheter and its curvature that cannot be displayed by sensor data alone; (9) using non-contact cameras with optical (including photogrammetry), depth, and infrared sensors to monitor heart rate, blood pressure, respiratory rate, patient location/movement, physician/staff movement, and device tracking, etc.; (10) internally cross-validating location using optical bronchoscope and catheter EM sensors (or RFID), as well as external sources (e.g., if the physician feeds the catheter or rotates it externally, the internal sensors should move by the same ratio in response); (11) using device tracking to allow for verification of real time tracking and user tendencies; (12) feeding the biometrics and patient location and movement information into location and motion feedback loop for navigation through dynamic anatomy and/or physiology, as well as feeding using AI algorithms and patient sensor triplets (i.e., merging external and internal sensors with predictive modeling); (13) tracking in 3D optical on a 2D screen with haptic feedback (which is currently done on Hugo), to incorporate on cryo-ablation cardiac and lung procedures; (13a) using head-mounted 3D views in 3D without a screen; (13b) using hand and gesture tracking on head-mounted XR displays to control robotic end-effectors, activate energy, and/or trigger automated instrument exchange; (13c) using XR headsets to visualize the surgical scene via optics (e.g., using the orientation of the headset, endoluminal cameras attached to the robot can be steered as the head rotates (with the system using inverse kinematics to map the input pose to desired robot arm joint angles); using corresponding input devices, paired with the headset, to control guide catheters and other auxiliary functions on the robot; etc.); (13d) using optics with navigation sensors to co-validate location and to allow for superimposing or merging multiple modalities; (13e) digitally displaying targets and trajectories in this coordinate system, as well as viewing anatomical movement (e.g., overlaying where adjacent structure like the esophagus and phrenic nerve are that cannot be seen optically alone); (13f) reconstructing in 3D surgical scenes that are viewed by the optics throughout the procedure and using these for post-op analysis, pre-op optimization, and clinical training; (14) enabling the coordinate system (whether with robotics or not) to be tracked, replayed for manual analyses, or fed into the database for analyses and linkages to similar cases and acute/chronic outcomes; (15) displaying in the 3D view balloon pressure and sensor data in the preferred field of view of the medical professional, and using trigger sounds and images to alert on the 3D image and/or plots all at once to reduce cognitive load (i.e., to obviate the medical professional having to look back and forth among the console, patient, instruments, and navigation system) (e.g., irrigation or chemical ablation pressures, volumes, and flows may be fed into the 3D view like catheter/capital sensor data for a balloon catheter, etc.); (16) enabling visualization of location contact before ablation, prediction of ablation shape and depth, tagging of lesions (without having to inform an additional person on the map/nav console and looking away each time), recommendations on settings, location, and/or contact force to ensure contiguous lesion sets; (16a) enabling viewing of the contrast for chemical/alcohol visualization in 3D in XR with contrast (similar to microwave, electroporation, RF, or cryo lesion formation visualization in real time (using MM, bi-planar fluoroscopy, or Ultrasound) or the prediction via intra/post-op imaging and time-series data; and this may be modeled with FEA or CFD to feed into the digital twin); (16b) enabling imaging of the cryoballoon in real time on MRI to visualize the ice ball formation, and creating the digital twin via real-time imaging tools and/or sensor data to visualize, control, and predict in XR; (16c) enabling visualization of ablation shapes and location on the digital twin; (17) enabling viewing and managing of variable flow measures from capital equipment and/or catheter pressure sensors in XR field of view; (17a) enabling viewing, hearing, and control of warnings or cautions, visualization of predicted ablations, decisions such as start and stop of ablation, etc., in XR; (17b) enabling analysis of this time-series data (including, but not limited to, patient biometrics, ablation information, acute isolation, and/or chronic recurrence, etc.) using machine learning; (17c) enabling feeding of these time-series analyses into a real-time application as data is being streamed and/or analyzed; (18) using image classification for auto-segmentation of imaging, identification of structures to ablate or avoid relative to previous morphology data, and providing structural change predictive modeling to the compensate for movement, posture, body fluid amount (e.g., dehydration), etc.; (18a) feeding a combination of these into a robotic compensating system; (18b) displaying any sensor data for barotrauma in XR and feeding this data into the AI feedback loop to recommend procedural changes; (18c) including real time fluoroscopy, biplanar fluoroscopy, and/or ventilator data/waveforms (Boyle's Law) in the image analyses and time series data; (18d) specifying a unique set of anatomy and describing the target lung tissue versus other structures, for the auto-segmentation and object recognition, and merging several image modalities to visualize smooth muscle, cartilage, gland, etc.; (19) aligning with features being built into Hugo (e.g., aligning with the Digital Surgery application that uses optical means of interfacing and AI algorithms to do actions like de-identifying faces and medical documents in the field of view; building in this functionality while adding imaging and EM navigation; etc.); (19a) enabling visualization in 3D with glasses and head track (and simulating eye gaze so if the medical professional looks away, a procedure cannot accidentally take place, in some cases using 3D image with 3D modality like a headset instead of a screen), haptic interactions with optical views, overlays of target and adjacent structures, etc.; (19b) using auto-stereoscopic 3D displays so users do not need to wear 3D glasses to operate the device (and using alternative approaches to head tracking, like gaze tracking from stereoscopic cameras, or using gaze inputs to control and/or activate certain features of the device (e.g., motion scaling, energy activation, and optical settings) in a hands-free mode; (20) enabling size reduction via AI enhancement and digital twins/XR; (20a) including use of a lower quality/smaller camera in the case that AI image enhancement is incorporated; (20b) reducing the number of sensors for navigation or contact sensing when using XR digital twins and algorithms to predict pathways and interpolate device/ablation shapes; (21) feeding data from use of different wavelengths or impedance to indicate lesion success into a virtuous data loop, and visualizing this data in XR; (21a) integrating data from optical, infrared, depth, sensors to create multiple layers of data for multi-mode cameras (e.g., HoloLens or Kinect cameras that have optical, infrared, depth, sensors, etc.); (22) including increased sensory perception data with visual XR cues and motion compensation, auditory cues, and with included haptics; and (22a) enabling adjusting of settings to give haptic, visual, and/or auditory feedback at different sensitivity levels for danger versus targeted areas; and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, medical operation technology, medical procedure technology, medical imaging technology, medical visualization and mapping technology, medical assistance technology, and/or the like. In other aspects, certain embodiments, can improve the functioning of user equipment or systems themselves (e.g., medical operation system, medical procedure system, medical imaging system, medical visualization and mapping system, medical assistance system, etc.), for example, by receiving, using a computing system, one or more first layer input data from one or more first devices, the one or more first layer input data comprising at least one of movement data, position data, relative distance data, or externally observable data for each of one or more persons and one or more objects within a room; receiving, using the computing system, one or more second layer input data from one or more second devices, the one or more second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient; analyzing, using the computing system, the received one or more first layer input data and the received one or more second layer input; generating, using the computing system, one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient; generating, using the computing system, one or more extended reality ("XR") images, based at least in part on the generated one or more recommendations; and presenting, using the computing system and using a user experience ("UX") device, the generated one or more XR images; and/or the like.

In particular, to the extent any abstract concepts are present in the various embodiments, those concepts can be implemented as described herein by devices, software, systems, and methods that involve specific novel functionality (e.g., steps or operations), such as, implementing an intelligent assistance ("IA") or extended intelligence ("EI") ecosystem that receives and combines the one or more first layer input data (i.e., room content-based data) and the one or more second layer input data (i.e., patient and/or tool-based data); that analyzes these data and generates recommendations for guiding a medical professional in guiding the one or more surgical devices toward and within a lung of the patient to perform a pulmonary procedure, based at least in part on the analysis; that generates the one or more XR images; and that presents (using the UX device) the generated one or more XR images, and/or the like, to name a few examples, that extend beyond mere conventional computer processing operations. These functionalities can produce tangible results outside of the implementing computer system, including, merely by way of example, optimized and comprehensive IA or EI ecosystem that achieves better safety and efficacy (i.e., compensating for at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient, as well as excessive movement of the user or physician, while reducing or eliminating the use of fluoroscopy, etc.), while reducing costs of operation of the system, increasing throughput of procedures, providing predictable procedure durations, reducing cognitive overload for the physician, increasing longevity of physician careers (e.g., by wearing lead during fluoroscopy), and/or the like, at least some of which may be observed or measured by users, patients, and/or service providers.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Specific Exemplary Embodiments

We now turn to the embodiments as illustrated by the drawings. FIGS. 1-9 illustrate some of the features of the method, system, and apparatus for implementing medical assistance technologies, and, more particularly, to methods, systems, and apparatuses for implementing intelligent assistance ("IA") or extended intelligence ("EI") ecosystem, and even more particularly, to methods, systems, and apparatuses for implementing extended intelligence for pulmonary procedures, as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

Figure 1:
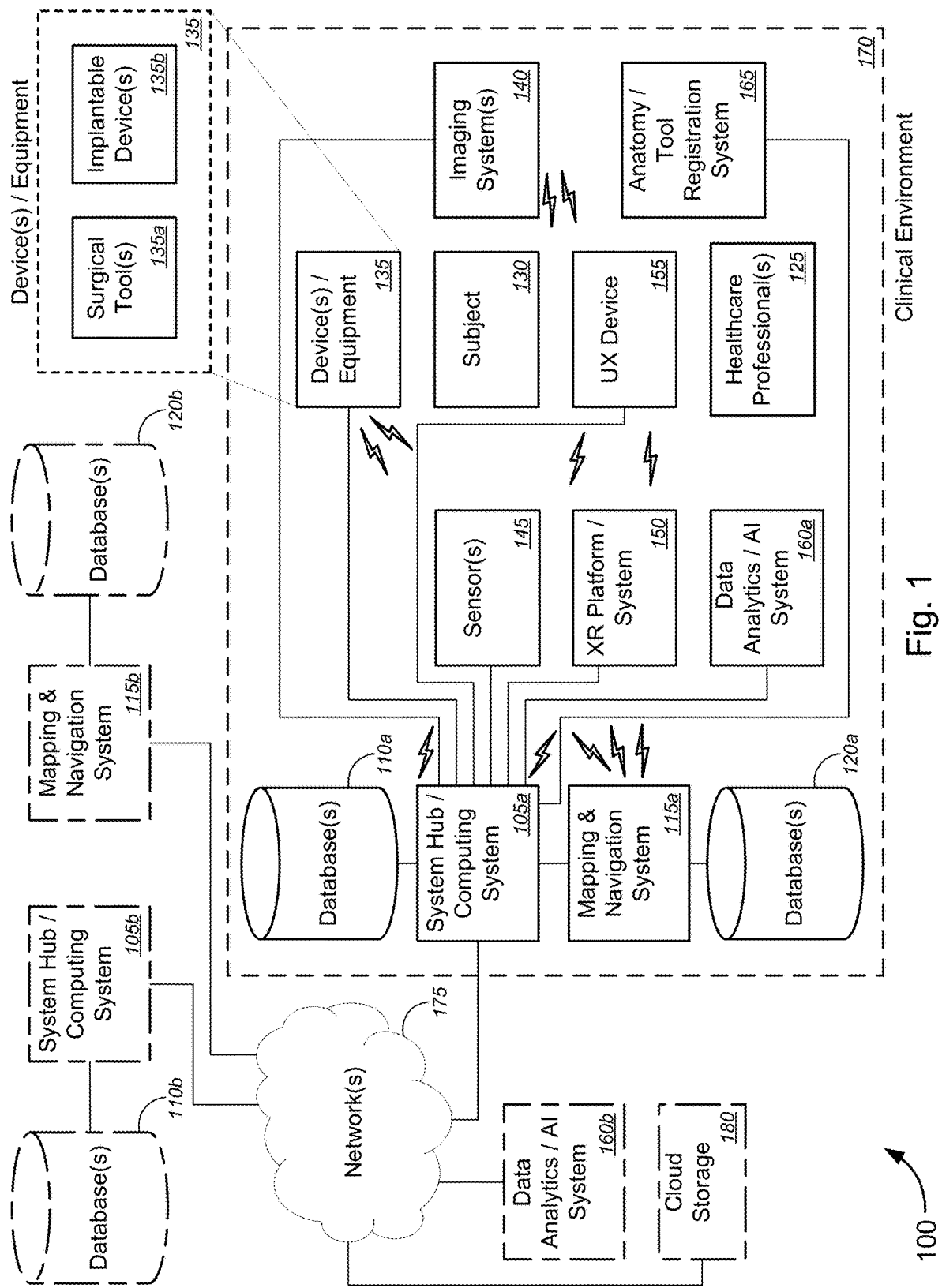
FIG. 1 is a schematic diagram illustrating a system for implementing an intelligent assistance ("IA") or extended intelligence ("EI") ecosystem for pulmonary procedures, in accordance with various embodiments.

With reference to the figures, FIG. 1 is a schematic diagram illustrating a system 100 for implementing an intelligent assistance ("IA") or extended intelligence ("EI") ecosystem for pulmonary procedures, in accordance with various embodiments. Herein, the pulmonary procedure may include, without limitation, at least one of a bronchoscopy procedure, a lung tissue denervation procedure, a lung tissue biopsy procedure, a chronic obstructive pulmonary disease ("COPD") diagnosis procedure, a dyspnea diagnosis procedure, a pneumonia diagnosis procedure, an asthma diagnosis procedure, a long-term corona virus diagnosis procedure, an anaphylactic response diagnosis procedure, a bronchitis diagnosis procedure, a lung cancer diagnosis procedure, a COPD treatment procedure, a dyspnea treatment procedure, a pneumonia treatment procedure, an asthma treatment procedure, a long-term corona virus treatment procedure, an anaphylactic response treatment procedure, a bronchitis treatment procedure, or a lung cancer treatment procedure, and/or the like.

In the non-limiting embodiment of FIG. 1, system 100 might comprise a system hub or computing system 105a and corresponding database(s) 110a. In some cases, the database(s) 110a may be local to the system hub or computing system 105a. In some cases, the database(s) 110a may be external, yet communicatively coupled to the system hub or computing system 105a. In other cases, the database(s) 110a may be local and integrated within the system hub or computing system 105a. System 100, according to some embodiments, might further comprise mapping and navigation system 115a and corresponding database(s) 120a. Like database(s) 110a, the database(s) 120a may be local to the mapping and navigation system 115a. In some cases, the database(s) 120a may be external, yet communicatively coupled to the mapping and navigation system 115a. In other cases, the database(s) 120a may be local and integrated within the mapping and navigation system 115a.

System 100 might include, without limitation, at least one of one or more healthcare professionals 125, a subject 130, one or more devices or equipment 135, one or more imaging systems 140, one or more sensors 145, an extended reality ("XR") platform or system 150, a user experience ("UX") device 155, a data analytics or artificial intelligence ("AI") system 160a, or an anatomy or tool registration system 165, and/or the like. In some instances, the system hub or computing system 105a and corresponding database(s) 110a, the mapping and navigation system 115a and corresponding database(s) 120a, and the at least one of the one or more healthcare professionals 125, the subject 130, the one or more devices or equipment 135, the one or more imaging systems 140, the one or more sensors 145, the XR platform or system 150, the UX device 155, the data analytics or AI system 160a, or the anatomy or tool registration system 165, and/or the like, may be located or disposed within clinical environment 170. In some cases, the clinical environment 170 might include, but is not limited to, a clinic, a hospital, an operating room, an emergency room, a physician's office, or a laboratory, or the like.

In some embodiments, the system hub or computing system 105*a* might include, without limitation, at least one of an XR computing system, a medical procedure computing system, a hub computing system, a three-dimensional ("3D") graphical processing unit, a cluster computing system, a four-dimensional ("4D") graphics computing system, a server computer, a cloud computing system, or a distributed computing system, and/or the like. In some instances, the one or more healthcare professionals 125 might include, without limitation, at least one of one or more doctors, one or more surgeons, one or more cardiologists, one or more electrophysiologists, one or more cardiac surgeons, one or more neurosurgeons, one or more radiologists, one or more scenographers, one or more nurse practitioners, one or more nurses, one or more medical specialists, one or more medical imaging specialists, and/or the like. In some cases, the subject 130 might include, but is not limited to, one of a human patient; a large animal (e.g., pig, sheep, dog, etc.); a small animal (e.g., rabbit, rat, mouse, etc.); an organ (e.g., explant, transplant, decellularized, deceased, generated, synthetic, etc.); an organelle; one or more organs on a chip; one or more tissue constructs; one or more cells; one or more microbes of bacterial vectors; one or more microbes of viral vectors; one or more microbes of prion vectors; one or more genes, deoxyribonucleic acid ("DNA"), ribonucleic acid ("RNA"); one or more hormones, one or more biochemicals, one or more molecules; one or more tissues, one or more blood vessels, or one or more bones; and/or the like.

According to some embodiments, the one or more devices or equipment 135—which might include surgical tool(s)/device(s) 135*a*, implantable device(s) 135*b*, or the like—might include, but is not limited, at least one of one or more catheters, one or more catheter interconnect cables, one or more balloons, one or more rigid robotic devices, one or more soft robotic devices, one or more robotic systems, one or more robotic arms, one or more needles, one or more therapeutic delivery devices, one or more diagnostic devices, one or more diagnostic catheters, one or more bronchoscopes, one or more surgical tools, one or more drug pumps, one or more delivery pharmaceuticals, one or more biopsy tools, one or more excision tools, one or more ablation tools, one or more monitoring devices, one or more cameras, one or more imaging tools, one or more fiducials, one or more staples, one or more anchors, one or more lasers, one or more guide wires, one or more introducers, one or more sheaths, one or more pillcams, one or more clips, one or more capsules, one or more energy delivery tools, a catheter electrode distribution system ("CEDS"), a pulsed field ablation ("PFA") system, a PFA console, an electroporation system, an electroporation control console, a cryoballoon or a cryoablation catheter, a cryoablation console, a radio frequency ("RF") ablation-based system, an RF ablation control console, a laser ablation-based system, a laser ablation control console, a radiation ablation-based system, a radiation ablation control console, a microwave ablation-based system, a chemical ablation-based system, a loop catheter, a hoop catheter, a circular catheter, an RF catheter, a phased RF catheter, a high intensity focused ultrasound ("HIFU") system, a HIFU control console, or one or more capital equipment, and/or the like. The one or more devices or equipment 135 might be configured to perform one or more tasks.

In some embodiments, the one or more tasks might include, without limitation, at least one of a surgical procedure, a bronchoscopy procedure, a lung tissue denervation procedure, a lung tissue biopsy procedure, a chronic obstructive pulmonary disease ("COPD") diagnosis procedure, a dyspnea diagnosis procedure, a pneumonia diagnosis procedure, an asthma diagnosis procedure, a long-term corona virus diagnosis procedure, an anaphylactic response diagnosis procedure, a bronchitis diagnosis procedure, a lung cancer diagnosis procedure, a COPD treatment procedure, a dyspnea treatment procedure, a pneumonia treatment procedure, an asthma treatment procedure, a long-term corona virus treatment procedure, an anaphylactic response treatment procedure, a bronchitis treatment procedure, or a lung cancer treatment procedure, and/or the like.

According to some embodiments, the one or more imaging devices or systems 140 might include, but is not limited to, at least one of a magnetic resonance imaging ("MRI") system, a diffusion-tensor imaging ("DTI") system, a computed tomography ("CT") system, an ultrasound ("US") system, a transesophageal echocardiography ("TEE") system, an intra-cardiac echocardiography ("ICE") system, a transthoracic echocardiography ("TTE") system, an intravascular ultrasound ("IVUS") system, an electromechanical wave imaging ("EWI") system, a neuro-endoscopy system, a single photon emission computed tomography ("SPECT") system, a magnetic resonance angiography ("MRA") system, a computed tomography angiography ("CTA") system, a blood oxygen-level dependent signal ("BOLD") system, an arterial spin labeling ("ASL") system, a magnetoencephalography ("MEG") system, a positron emission tomography ("PET") system, an electroencephalography ("EEG") system, an optical coherence tomography ("OCT") system, an optical imaging spectroscopy ("OIS") system, a magnetic resonance spectroscopy ("MRS") system, a dynamic susceptibility contrast ("DSC") MRI system, a fluid-attenuated inversion recovery ("FLAIR") system, a fluoroscopy system, an X-ray system, a 3D scanning system, an infrared ("IR") system, an ultraviolet ("UV") system, a bioluminescent system, an endoscopy system, a triboluminescence system, an image fusion system, or a microscope, and/or the like.

In some embodiments, the one or more sensors 145 might include, without limitation, at least one of one or more chronically implanted sensors, one or more diagnostic sensors, one or more surgical sensors, one or more wearable sensors, one or more gas sensors, one or more optical sensors, one or more impedance sensors, one or more ultrasound sensors, one or more flow sensors, one or more blood velocity sensors, one or more blood volume sensors, one or more motion sensors, one or more sound sensors, one or more blood pressure sensors, one or more heart rate sensors, one or more pulse sensors, one or more oxygen sensors, one or more pulse oximetry sensors, one or more carbon dioxide ("$CO_2$") sensors, one or more fluid levels, one or more lung volume sensors, one or more respiration rate sensors, one or more tidal volume sensors, one or more lung filling pressure sensors, one or more piezoelectric sensors, one or more accelerometers, one or more image sensors, one or more acoustic sensors, one or more temperature sensors, one or more ambulatory activity monitoring sensors, one or more patient weight sensors, one or more patient mattress sensors, one or more doppler sensors, one or more biomarker sensors, one or more perfusion sensors, one or more electromyography ("EMG") sensors, one or more electrocardiography ("ECG") sensors, one or more sleep sensors, one or more hematocrit ("HCT") level sensors, one or more biometric sensors, one or more electroencephalographic ("EEG") sensors, one or more apnea monitoring sensors, one or more dyspnea monitoring sensors, one or more nociception monitoring sensors, or one or more pain sensors, and/or the like.

According to some embodiments, the XR platform or system 150 might include, without limitation, at least one of an XR headset, a set of XR goggles, a pair of XR-enabled eyewear, an XR-enabled smartphone mounted in a headset, an XR helmet, a mixed reality ("MR") headset, a set of MR goggles, a pair of MR-enabled eyewear, an MR-enabled smartphone mounted in a headset, an MR helmet, a virtual reality ("VR") headset, a set of VR goggles, a pair of VR-enabled eyewear, an VR-enabled smartphone mounted in a headset, an VR helmet, an augmented reality ("AR") headset, a set of AR goggles, a pair of AR-enabled eyewear, an AR-enabled smartphone mounted in a headset, or an AR helmet, and/or the like. Herein, VR might refer to a simulated experience that uses fully virtual constructs generated by a computing system or the like, while AR might refer to an interactive experience of a real-world environment where objects in the real-world are enhanced or augmented by computer-generated perceptual information (in some cases, including visual, auditory, haptic, somatosensory, and/or olfactory information). MR might refer to a merging of the real and virtual worlds to produce new environments and visualizations in which physical and virtual objects co-exist and interact in real-time (in some cases, MR might include AR plus physical interaction and information from the environment that goes beyond just visual aspects, or the like). XR might refer to real and virtual combined environments and human-machine interactions generated by a computing system or the like, and includes AR, MR, and/or VR.

In some instances, the XR platform or system 150 might generate one or more XR experiences including, but not limited to, at least three or more of the one or more XR images, one or more XR sounds, one or more XR haptic or tactile responses, one or more XR simulated smells, or one or more XR simulated tastes, and/or the like, in some cases, based at least in part on the mapping performed by the mapping and navigation system 115a. In some instances, the mapping and navigation system 115a might include, but is not limited to, at least one of an electroanatomic mapping ("EAM") system, an electromagnetic ("EM") mapping and/or navigation system, a radiofrequency identification ("RFID") mapping and/or navigation system, an impedance-based mapping and/or navigation system, an ultrasound ("US") mapping and/or navigation system, an optical mapping and/or navigation system, a high-density mapping catheter (e.g., Achieve™ mapping catheter, Achieve Advance™ mapping catheter, Marini™ CS mapping catheter, Marini™ MC mapping catheter, Marini™ MCXL mapping catheter, Marinr™ SC mapping catheter, StableMapr™ mapping catheter, or the like), one or more patient patches, or navigation hardware and software, and/or the like.

In some embodiments, the UX device 155 might include, without limitation, at least one of a headset, UX glasses, a viewing window, a supplement to existing glasses, headphones, UX contact lenses, a heads-up display ("HUD") device, a 3D spatial sound system, a telemonitoring system, a rigid robotic device control and sensory feedback system, a soft robotic device control and sensory feedback system, an eye control system, a voice control system, a remote control system, a gesture-based control system, a sign language-based control system, a body-part-based control system, a joystick, a mouse, a two-dimensional ("2D") screen display, a 3D refractive display, a parallel reality system, a projection system, a 3D printed reconstruction system, a customized view generation system, a ghosting and prediction system, a master-slave control system, an annotation system, or a haptic feedback system, and/or the like.

Merely by way of example, in some cases, alternative or additional to the system hub or computing system 105a and corresponding database 110a, the mapping and navigation system 115a and corresponding database 120a, and/or data analytics or AI system 160a being disposed within clinical environment 170, system 100 might comprise remote system hub or computing system 105b and corresponding database(s) 110b, remote mapping and navigation system 115b and corresponding database(s) 120b, and/or data analytics or AI system 160b that communicatively couple with the system hub or computing system 105a (or communications system (not shown)) disposed within the clinical environment 170 via one or more networks 175. According to some embodiments, system 100 might further comprise (optional) cloud storage 180, which communicatively couples with the system hub or computing system 105a via the one or more networks 175. Merely by way of example, network(s) 175 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, network(s) 175 might each include an access network of an Internet service provider ("ISP"). In another embodiment, network(s) 175 might each include a core network of the ISP, and/or the Internet.

According to some embodiments, one or more catheter interconnect or interface cables may be used. In some instances, the one or more catheter interconnect or interface cables might include a chip or memory device that is used to store, collect, and transfer data for the XR database. The chip or memory device may also be used to authenticate the device (e.g., as being compatible with the system or as being procedure-qualified, or the like), and may include security features that, when enabled, prevents information from being read or written. For single use devices, this chip or memory device can limit the number of uses to 1. In this manner, the catheter interconnect or interface cables may be used to meet business and/or healthcare requirements: (1) to restrict to single use of a device; (2) to authenticate the device as a real, approved device; (3) to secure the data stored on the device for access by only authorized users; and/or the like. In addition, the catheter interconnect or interface cables may also be used to achieve future additional business and/or healthcare requirements, including, but not limited to: (4) storing, collecting, and/or transferring data for XR applications; and/or the like. To incorporate a chip or memory device into a catheter, the chip or memory device might be mounted on a printed circuit board ("PCB"), which could include other hardware to enable features including, but not limited to: device or procedure sensing (e.g., temperature, orientation, acceleration, position, pressure, humidity, audio record, etc.); wireless communication (e.g., Bluetooth™, network, RFID, etc.); manufacturing and/or device history data storage and transfer to XR information database; and/or the like.

In some aspects, the IA or EI ecosystem, as represented by FIG. 1 for example, might achieve one or more of the following features or functionalities: (1) fast visualization to shorten procedure time; (2) less recurrence for optimal patient outcomes; (3) lower healthcare utilization costs and lower capital equipment costs; (4) flexibility; and/or (5) fluoroless implementation; or the like. To achieve fast visualization, the IA or EI ecosystem might implement one or more of the following: identify targets in seconds or minutes, maintain occlusion and contact, and/or titrate dosage to reduce number of ablations (thus shortening procedure time), or the like. To achieve less recurrence, the IA or EI ecosystem might implement one or more of the following: utilize powerful predictive analytics in comparison with existing visualization systems, visualize and personalize to patient-specific anatomy, implement multiple checkpoints during each procedure to ensure best patient outcomes, and/or collect occlusion assessment and lesion tagging data, or the like. To achieve lower costs, the IA or EI ecosystem might implement one or more of the following: avoid using expensive capital equipment and/or utilizing MR or XR, which is more than 70% less costly than existing mapping and visualization systems used in arrhythmia treatment or the like. To achieve flexibility, the IA or EI ecosystem might implement one or more of the following: utilize an open system that uses MR or XR with any energy source and/or implement remote sales operation (to achieve geographic flexibility in hard-to-reach locations), or the like. To achieve fluoroless implementation, the IA or EI ecosystem might implement one or more of the following: avoid radiation exposure and/or achieve high resolution imaging of internal lung structures without exposing patients to radiation, or the like. Alternatively, or additionally, the IA or EI ecosystem, as represented by FIG. 1 for example, may achieve one or more of the following features or functionalities: (6) improved therapy delivery accuracy for intended targets for better efficacy; (7) reduction in adjacent structure damage; (8) reduced cognitive load for the healthcare professional; (9) reduced exposure to radiation for the patient and/or healthcare professional; (10) simulated patient dye for target organs or tissue; (11) reduction in the number of people needed due to increased control by the user or operator; (12) improved telementoring (e.g., allowing a physician to remotely mentor medical professionals via virtual communication technologies, etc.); (13) improved telemedicine; and/or (14) enables social distancing or total separation (to address pandemic-related issues, such as COVID-19 issues, or the like).

To implement the IA or EI ecosystem, once the anatomy can be visualized and the location of therapy delivery can be navigated to, the choice of device(s) and how to control the device(s) is the next building block. It may be a robotic system like the Hugo/Einstein for soft tissues (Mazor for bone), catheters, delivery systems, surgical tools, etc., such as described above with respect to the one or more devices or equipment 135, or the like. In order for a physician or healthcare professional (such as healthcare professionals 125, or the like) to have real time actionable data, sensors (such as sensors 145, or the like) need to be employed in the system on the patient (e.g., subject 130, or the like), provider, tools, and equipment (e.g., devices or equipment 135, or the like). For example, the visualization tool such as XR hardware (including, but not limited to, MicrosoftHoloLens®, or the like) might have several cameras and sensors (not only for visualization) to measure key biometrics in a non-contact manner. In some instances, the visualization tool such as XR hardware may utilize photogrammetry for calibration and/or fiducials (i.e., markers or objects placed in a field of view or imaging system for use as a point of reference or measure, or the like). Depending on the procedure and the need, there may be several sensors that can be employed, for example, eye gazing on the Hugo robot might shut down the system to avoid inadvertent movement or injury, which could be employed via the HoloLens headset on any therapy delivery (including, without limitation, tumor ablation, pulmonary ablation, etc.).

Now that the sensors have gathered the data, the data must be processed for use by the physician or healthcare professional. For instance, a general workflow for processing the data might include the following: (i) problem definition (including, but not limited to, objectives, hypotheses, measurement, cohorts, and/or end points, or the like); (ii) data collection (including, but not limited to, access, transfer, governance, and/or storage of data including, without limitation, internal/external data, historical data, batch data, streaming data, and/or log data, or the like); (iii) data curation (including, but not limited to, quality, cleaning, merging, segmenting, and/or transforming, or the like); (iv) model building (including, but not limited to, features, test models, test analytics, and/or validation, or the like); (v) analysis (including, but not limited to, exploring, analyzing, adjusting, and/or repeating one or more of data mining, AI machine learning or deep learning, statistical analysis, and/or natural language processing, or the like); (vi) visualization (including, but not limited to, graphical, tabular, and/or dashboard visualization of real-time, near-real-time, and/or aggregate data, or the like); (vii) insight and action (including, but not limited to, trends, what, why, and/or how, or the like); and (viii) follow-up (including, but not limited to, prescribing follow-up and long-term monitoring, or the like). Such general workflow may be used to process the three V's of big data—namely, volume (including, without limitation, health records, insurance, transactions, and/or mobile sensors, or the like), velocity (including, without limitation, batch, near-real-time, real-time, and/or streaming, or the like), and variety (including, without limitation, structured, unstructured, semi-structured, and/or the like).

The types of data, sources, and processing methods or analytics might include, but are not limited to, auto-segmentation; geometric analyses; device stabilization and filtering; algorithms; anomalies; outliers; trends over time; image identification or recognition; mobile sensors; measures and prediction for custom, group, etc. (e.g., procedural times, cost, fluoroscopy use, team performances, or the like); device acute or chronic performance prediction (e.g. rhythm prediction before and during ablation, or the like); reimbursement or insurance analytics or treatment; health records; transactions; prescriptive modeling; predictive modeling; forecasting or extrapolation; diagnostic or statistical analyses; dashboards or alerts; query or drilldown; Ad hoc reports; standard reports; Internet of Things ("IoT"); data mining; and/or the like. Alternatively, or additionally, the types of data, sources, and processing methods or analytics might include, without limitation, structured; unstructured; semi-structured; multi-device factors; multi-comorbidity factors; data analytics; data privacy; data science; data visualization; simulations; predictions; recommendations; probability of success and adverse events; precise and personalized care; optimizing therapy delivery; evidence based medicine; value-based healthcare ("VBHC"); predictive analytics; prescriptive analytics; care management and real-time patient monitoring; computer aided detection ("CADe"); computer aided diagnosis ("CADx"); medical image processing; device feedback; subject feedback; demographics, global, regional, local, racial, social, familial, diet, mental, emotional, spiritual, attitudinal, genetic, lifestyle, insurance, economic factors, or the like; pre-procedural; intraprocedural; post-procedural; chronic; and/or the like.

In a specific, non-limiting example data use case (i.e., utilizing the HoloLens or the like), goals of a solution architecture for analytics and machine learning might include, but are not limited to: telemetry capture (including, without limitation, 3D positioning of a catheter in real-time, procedure duration and ablation accuracy, heart rhythm, electrical signal reduction, scarred or destroyed tissue, and other vitals, or the like); providing for retrospective analytics (including, without limitation, analyzing individual and arbitrary aggregations of procedures on an ad hoc basis, answering common questions to drive data-driven improvements to procedure (e.g., "how much time is spent in various areas of the lung(s)?" and "what was the accuracy and outcome of the procedure?" or the like)); machine learning integration (including, without limitation, real-time and offline or batch, support proposed use cases (e.g., providing real-time prediction of impact that the procedure has had on electrical signal and prognosis; providing real-time estimate of tissue scarred or destroyed, including percentage considered "in excess"; providing information regarding depth, width, and/or permanency of tissue damage or destruction (e.g., some ablation types like reversible (compared with irreversible) electroporation actually open up cell walls to all for drugs to enter then heal and close up, or the like)); providing real-time anomaly detection of vitals, including dips, peaks, and long-term trend variance; recommending patient-specific ablation locations to reduce probability of repeat surgery; recommending path optimization for procedure based on patient-specific anatomy; or the like)).

With so many data sources, the packaging of display of these into a user interface (such as a UX device, or the like) to only have the right information, at the right time, and in the right place needs to be done to minimize cognitive overload. Although we have shown 3D screen and 3D headset examples, several UX types and feedback loops that can be employed are as described above with respect to UX device 155. All of the parts of the system need to communicate in a seamless manner in order to be useful in real time. The parts of a non-limiting XR or IA/EI ecosystem, according to some embodiments, might include, without limitation, headset; tethered unit; cloud; data warehouse; data lake; computer processor; and/or the like. Lastly, the application of the ecosystem can be deployed on various subjects (as described above with respect to subject 130).

In many aspects, system 100 may provide IA or EI ecosystem functionality for any number of tasks, such as those described in detail in the '278, '283, '289, and '632 applications (i.e., the "Related Applications"), which have already been incorporated herein by reference in their entirety for all purposes. The various embodiments described herein focus on those tasks associated with pulmonary procedures including, but not limited to, at least one of a bronchoscopy procedure, a lung tissue denervation procedure, a lung tissue biopsy procedure, a chronic obstructive pulmonary disease ("COPD") diagnosis procedure, a dyspnea diagnosis procedure, a pneumonia diagnosis procedure, an asthma diagnosis procedure, a long-term corona virus diagnosis procedure, an anaphylactic response diagnosis procedure, a bronchitis diagnosis procedure, a lung cancer diagnosis procedure, a COPD treatment procedure, a dyspnea treatment procedure, a pneumonia treatment procedure, an asthma treatment procedure, a long-term corona virus treatment procedure, an anaphylactic response treatment procedure, a bronchitis treatment procedure, or a lung cancer treatment procedure, and/or the like.

In such operations, system hub or computing system 105*a* or 105*b* (collectively, "computing system" or the like) might receive one or more first layer input data from one or more first devices, the one or more first layer input data comprising at least one of movement data, position data, relative distance data, or externally observable data for each of one or more persons (e.g., subject 130, healthcare professional(s) 125, etc.) and one or more objects (e.g., device(s) or equipment 135, furniture, etc.) within a room (i.e., clinical environment 170, or the like). In such cases, the one or more first devices may include at least one of imaging system(s) 140, sensor(s) 145, and/or the like, that are configured to obtain, capture, or otherwise provide the one or more first layer input data. The computing system might receive one or more second layer input data from one or more second devices, the one or more second layer input data comprising at least one of one or more patient sensor data for monitoring procedure-relevant aspects of a patient (i.e., subject 130), one or more patient imaging data for monitoring images of one or more portions of a body of the patient, or one or more navigation and mapping data for monitoring one or more surgical devices (i.e., the devices or equipment 135, or the like) relative to the one or more portions of the body of the patient, and/or the like. In such cases, the one or more second devices may include at least one of device(s) or equipment 135, imaging system(s) 140, sensor(s) 145, and/or the like, that are configured to obtain, capture, or otherwise provide the one or more second layer input data.

The computing system might analyze the received one or more first layer input data and the received one or more second layer input. The computing system might generate one or more recommendations for guiding a medical professional (i.e., healthcare professional(s) 125, or the like) in guiding the one or more surgical devices toward and within a lung of the patient to perform a pulmonary procedure, based at least in part on the analysis, the generated one or more recommendations comprising 3D or 4D mapped guides toward, in, and around the lung of the patient. The computing system might then generate one or more XR images (or one or more XR experiences), based at least in part on the generated one or more recommendations, and might present the generated one or more XR images (or one or more XR experiences) using a UX device 155. According to some embodiments, the one or more XR images might be dynamic images, which might include an overlay of data models depicting at least one of electrical pulses, blood flow, tissue movement, damage, stress, and/or the like, and thus may not be a still frame in 3D. In some embodiments, the one or more XR images might include, without limitation, at least one of one or more AR images, one or more AR videos, one or more VR images, one or more VR videos, one or more MR images, one or more MR videos, one or more XR images, or one or more XR videos, and/or the like.

According to some embodiments, the generated one or more XR images might be presented to provide one or more of: a guide for a medical professional (e.g., healthcare professional(s) 125, or the like), a navigation tool during the pulmonary procedure, a proximity detection tool during the pulmonary procedure, a 3D or 4D visualization view of the at least one or more portions of the patient, a heads-up display of at least one of the one or more first layer input data, a heads-up display of at least one of the one or more patient sensor data, a heads-up display of at least one of the one or more patient imaging data, a heads-up display of physiological data of the patient, or a heads-up display of procedure-related data of the patient, and/or the like. In some instances, generating the one or more XR images might comprise combining or mapping the received one or more first layer input data and the received one or more second layer input into a combined 3D or 4D representation, based at least in part on the analysis and the generated one or more recommendations; and generating the one or more XR images based on the combined 3D or 4D representation.

In some embodiments, the computing system might track the one or more surgical devices (e.g., devices or equipment 135, or the like), using at least one of an electromagnetic-based tracking system, a magnetic anomaly detection-based tracking system, a radio frequency identification ("RFID")-based tracking system, a Bluetooth-based tracking system, a wireless-based tracking system, an optical-based tracking system, a laser-based tracking system, an ultrasound ("US") imaging-based tracking system, a computer vision-based tracking system, a fluoroscopy-based tracking system, an MRI-based tracking system, an accelerometer-based tracking system, a global positioning system ("GPS")-based tracking system, an infrared ("IR")-based tracking system, an ultrasonic sound-based tracking system, a piezoelectric-based tracking system, a simultaneous localization and mapping ("SLAM")-based tracking system, an acoustic-based tracking system, a radar-based tracking system, a feature identification-based tracking system, a machine learning-based tracking system, a predictive tracking system, a prescriptive tracking system, or a near-field communications-based tracking system, and/or the like.

According to some embodiments, the computing system might receive one or more control inputs from the medical professional; might analyze the received one or more control inputs in conjunction with analysis of the received one or more first layer input data and the received one or more second layer input data; might generate one or more control instructions based at least in part on the analysis, the generated one or more control instructions taking into account movement including at least one of movement of the lung and surrounding tissue due to at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient, and/or the like; and might send the generated one or more control instructions to the robotic system (which may, in some cases, be included among the device(s) or equipment 135, or more specifically among the surgical tool(s) or device(s) 135a, or the like) to cause the robotic system to implement the pulmonary procedure within the lung of the patient.

In some instances, at least the processes of receiving the one or more first layer input data, receiving the one or more second layer input data, analyzing the received one or more first layer input data and the received one or more second layer input, generating the one or more recommendations, generating the one or more XR images, presenting the generated one or more XR images, receiving the one or more control inputs, analyzing the received one or more control inputs, generating the one or more control instructions, and/or sending the generated one or more control instructions may occur in a manner that is at least one of continual, dynamic, feedback-looped, updated, in real-time, or in near-real-time, and/or the like, during the course of the pulmonary procedure.

In some embodiments, the received one or more control inputs may comprise hand-movement-based control inputs resulting from movement of one or more hands of the medical professional. In such cases, analyzing the received one or more control inputs may comprise determining whether the hand-movement-based control inputs comprise inputs indicative of excessive movement of at least one hand of the one or more hands of the medical professional. As such, generating the one or more control instructions may comprise, based on a determination that the hand-movement-based control inputs comprise inputs indicative of excessive movement of at least one hand of the medical professional, the computing system generating one or more compensated control instructions that include control instructions that are based on hand-movement-based control inputs while dampening one or more particular control inputs that are based on excessive movement of the at least one hand of the medical professional. In some cases, using robotic placement, movement, and/or collision detection, the excessive movement of the at least one hand of the medical professional may be tracked relative to the robotic arm or relative to an implant device or catheter, with the computing system generating the one or more compensated control instructions accordingly.

According to some embodiments, the data processing and computation may be performed locally (e.g., at system hub/computing system 105a, mapping and navigation system 115a, XR platform/system 150, and/or data analytics/AI system 160a, or the like), may be performed at a remote system(s) (e.g., at system hub/computing system 105b, mapping and navigation system 115b, data analytics/AI system 160b, another server(s), and/or a cloud computing-based system, or the like), or may be performed using a combination of local and/or remote systems, or the like.

In some aspects, the IA or EI ecosystem may utilize AI-assisted image processing for determining an appropriate target site, image- and/or sensor-based catheter deployment (e.g., ablation catheter deployment, etc.) by a robotic machine, near-instant signal processing to confirm the success of the catheter deployment, ensuring complete connection to the catheter, confirming catheter positioning and location, and/or the like, all performed autonomously (or with minimal if any human input). In some embodiments, the procedure may be performed without fluoroscopy.

These and other functions of the system 100 (and its components) are described in greater detail below with respect to FIGS. 2-7.

Figure 2:
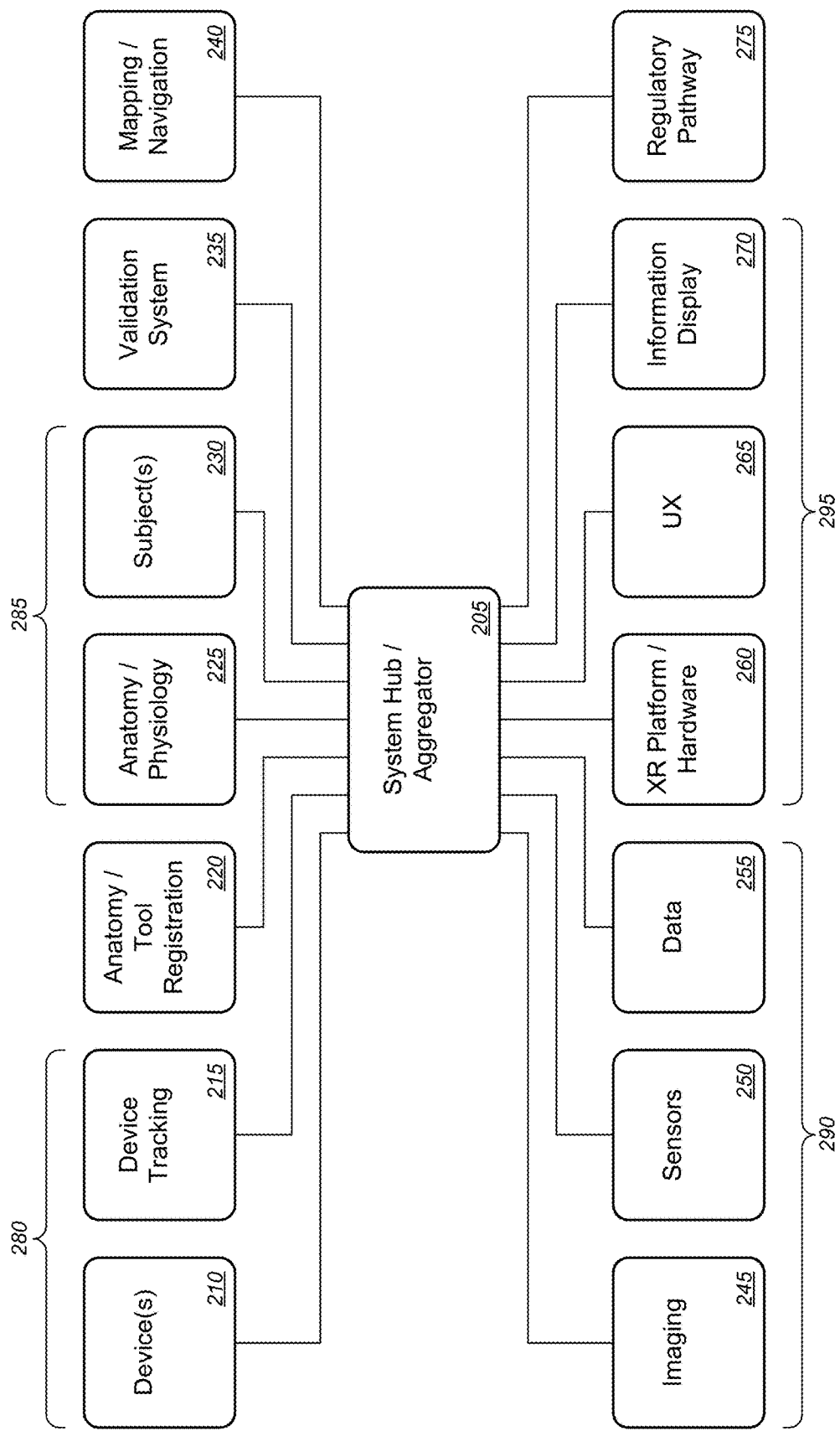
FIG. 2 is a schematic diagram illustrating a non-limiting example of building blocks for an IA or EI ecosystem that may be implemented for pulmonary procedures, in accordance with various embodiments.

FIG. 2 is a schematic diagram illustrating a non-limiting example 200 of building blocks for an IA or EI ecosystem that may be implemented for pulmonary procedures, in accordance with various embodiments.

With reference to the non-limiting example 200 of FIG. 2, the IA or EI ecosystem 200 might comprise a system hub or aggregator (block 205) and a plurality of components or building blocks of the IA or EI ecosystem (blocks 210-275) that are communicatively coupled with the system hub or aggregator (at block 205). In some embodiments, the plurality of components might include, without limitation, at least one of one or more devices (block 210) configured to perform one or more tasks (such as performing one or more medical procedures, including, but not limited to, a pulmonary procedure, such as COPD, or the like), a device tracking system (block 215) configured to track each device, an anatomy and/or tool registration system (block 220)

configured to register anatomy of a subject and/or tools used, anatomy or physiology (block 225) (i.e., anatomy or physiology of subjects or patients, or the like), one or more subjects or patients (block 230), a validation system (block 235) configured to validate information, a mapping or navigation system (block 240), one or more imaging systems (block 245), one or more sensors (block 250), data (particularly, regarding the one or more devices and/or the device tracking, or the like) (block 255), extended reality ("XR") platform or hardware (block 260), user experience ("UX") device or system (block 265), information display (block 270), or regulatory pathway system (block 275), and/or the like. The blocks 210 and 215 corresponding to the one or more devices and the device tracking system, respectively, are directed to or focused on the device or instrument aspects 280 of the system, while the blocks 225 and 230 corresponding to the anatomy or physiology and the one or more subjects, respectively, are directed to or focused on aspects of the subject(s) or patient(s) 285. Likewise, the blocks 245-255 corresponding to the one or more imaging systems, the one or more sensors, and the data, respectively, are directed to or focused on the data collection aspects 290 of the system, while the blocks 260-270 corresponding to the XR hardware, the UX device or system, and the information display, respectively, are directed to or focused on the user interface aspects 295.

According to some embodiments, the one or more devices (at block 210) may correspond to (or may include) the one or more devices or equipment 135 of system 100 of FIG. 1, or the like.

In some embodiments, the mapping or navigation system (at block 240) might include, without limitation, at least one of an XR computing system, a medical procedure computing system, a hub computing system, a three-dimensional ("3D") graphical processing unit, a cluster computing system, a four-dimensional ("4D") graphics computing system, a server computer, a cloud computing system, or a distributed computing system, and/or the like.

According to some embodiments, the one or more imaging systems (at block 245) may correspond to (or may include) the one or more imaging devices or systems 140 of system 100 of FIG. 1, or the like.

In some embodiments, the one or more sensors (at block 250) may correspond to (or may include) the one or more sensors 145 of system 100 of FIG. 1, or the like.

According to some embodiments, the user interface aspects 295 (at blocks 260-270) might include, but not limited to, at least one of a headset, UX glasses, a viewing window, a supplement to existing glasses, headphones, UX contact lenses, a heads-up display ("HUD") device, a 3D spatial sound system, a telemonitoring system, a rigid robotic device control and sensory feedback system, a soft robotic device control and sensory feedback system, an eye control system, a voice control system, a remote control system, a gesture-based control system, a sign language-based control system, a body-part-based control system, a joystick, a mouse, a two-dimensional ("2D") screen display, a 3D refractive display, a parallel reality system, a projection system, a 3D printed reconstruction system, a customized view generation system, a ghosting and prediction system, a master-slave control system, an annotation system, or a haptic feedback system, and/or the like.

Figure 3:
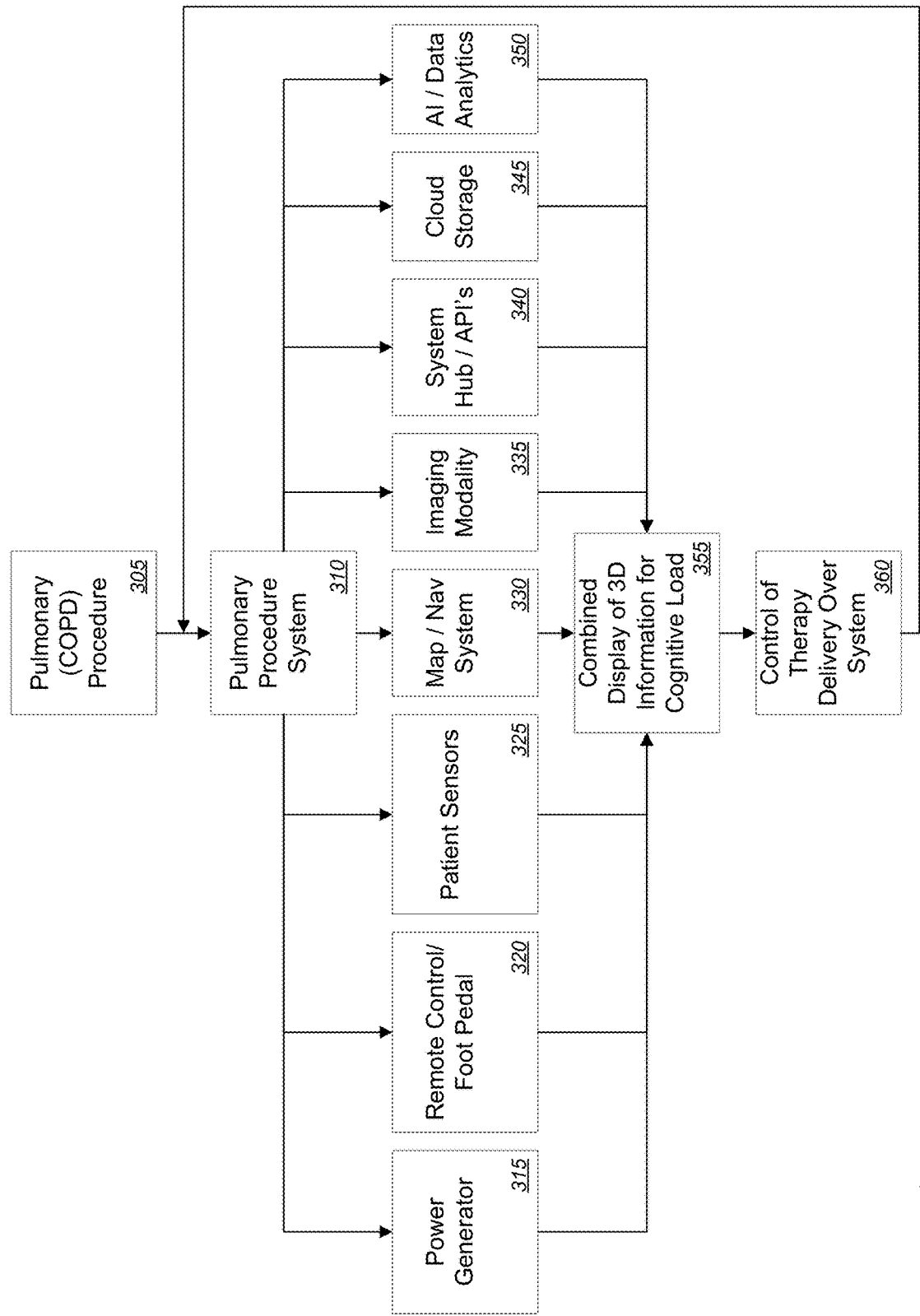
FIG. 3 is a schematic diagram illustrating a non-limiting example of a process stack for implementing an IA or EI ecosystem for pulmonary procedures, in accordance with various embodiments.

FIG. 3 is a schematic diagram illustrating a non-limiting example 300 of a process stack for implementing an IA or EI ecosystem for pulmonary procedures, in accordance with various embodiments.

With reference to the non-limiting example 300 of FIG. 3, a general process stack for implementing an IA or EI ecosystem for a pulmonary procedure, which may include, but is not limited to, at least one of a bronchoscopy procedure, a lung tissue denervation procedure, a lung tissue biopsy procedure, a chronic obstructive pulmonary disease ("COPD") diagnosis procedure, a dyspnea diagnosis procedure, a pneumonia diagnosis procedure, an asthma diagnosis procedure, a long-term corona virus diagnosis procedure, an anaphylactic response diagnosis procedure, a bronchitis diagnosis procedure, a lung cancer diagnosis procedure, a COPD treatment procedure, a dyspnea treatment procedure, a pneumonia treatment procedure, an asthma treatment procedure, a long-term corona virus treatment procedure, an anaphylactic response treatment procedure, a bronchitis treatment procedure, or a lung cancer treatment procedure, and/or the like. Such a process stack may begin with a selection of a pulmonary procedure or operation (e.g., COPD procedure, or the like) (at block 305). In response to such selection, a pulmonary procedure system (including, but not limited to, a cryoablation system, an electroporation system, a microwave ablation system, and/or a chemical system, or the like) may be implemented (at block 310).

The IA or EI ecosystem might utilize, in conjunction with the pulmonary procedure system (with sensors on the therapy delivering device also being referred to as "contacting internal sensors" or the like), a number of devices or equipment, sensors, imaging systems, and other systems (collectively, "pulmonary procedure sub-systems" or the like), including, but not limited to, at least one of a power generator (at block 315), a remote control and/or foot pedal control system (at block 320), or one or more patient sensors (at block 325), and/or the like. In some instances, the one or more patient sensors may include, but are not limited to, at least one of one or more room-based sensors (also referred to as "contactless sensors" or the like), an electrocardiogram ("ECG") monitor, a mapping vest (e.g., CardioInsight™ ("CIT") mapping vest, or the like; also referred to as "contacting external sensors" or the like), one or more other wearable sensors, one or more implanted sensors, and/or other patient sensors. The IA or EI ecosystem may further include, without limitation, a mapping and/or navigation system (at block 330), imaging modality (at block 335), a system hub and/or application programming interfaces ("API's") (at block 340), cloud storage (at block 345), or artificial intelligence ("AI") and/or data analytics (at block 350), and/or the like. In some cases, the mapping vest CardioInsight™ ("CIT") mapping vest, or the like, may be a single-use, disposable, multi-electrode vest that gathers cardiac electrophysiological data from the surface of the patient's body, with such data being combined with imaging data taken of the patient to produce and display simultaneous, bi-atrial and bi-ventricular 3D cardiac maps, or the like. Data from these sub-systems may be combined to generate a combined display of three-dimensional ("3D") information or four-dimensional ("4D") information (i.e., three-dimensional ("3D") information plus at least one of real-time updates, dynamic modeling, or data streaming, and/or the like) for cognitive load (at block 355). Such 3D or 4D information may be used to control therapy delivery over the system (e.g., via use of robotic systems, robotic arms, or the like) (at block 360). The process at blocks 310-360 may be repeated as necessary or as desired.

Table 1 below illustrates a specific non-limiting example combination(s) of sensors, imaging systems, tracking (or mapping and navigation) systems, and devices (e.g., robotic devices or the like) for each of the Pre-Operative Planning Stage, the Intra-Operative Adjustment Stage, and the Post-Operative Monitory Stage (as described below with respect to FIG. 5B) while implementing an IA or EI ecosystem for a pulmonary procedure. The various embodiments, however, are not limited to these items nor their specific combinations and can include any combination of items listed for sensors, imaging systems, tracking (or mapping and navigation) systems, and devices, e.g., as described below with respect to FIG. 7, or the like.

the like), a respiratory rate sensor, a fiducial tracking sensor to track motion of fiducials to maintain imaging/mapping/navigation alignment, a surgical tool object recognition system, robotic collision detection system, tracking system for tracking traffic flow in a room, user fatigue and/or cognitive overload detector, nociception monitoring sensors, and/or bed or mattress sensors, and/or the like, with (4) integrated robotics including a soft-tissue intra-luminal robotic ("ILR") system (where an intra-luminal device refers

TABLE 1

Combination List of Systems and Devices for implementing IA or EI ecosystem for a pulmonary procedure.

| Pre-Op Stage | Intra-Op Stage | | | | | Post-Op Stage Monitoring/ |
| --- | --- | --- | --- | --- | --- | --- |
| Integrated Diagnostics | Imaging Devices | Navigation/ Mapping | Sensor Devices | Integrated Robotics | AI/Data Analytics | Analytics Feedback |
| Biometric Input, Morphology Inputs, CT or MRI | EWI US | Optical with EM or RFID + 3D AR/US or EWI | Contactless Optical, IR Temp, Blood Pressure, Heart Rate, Motion from Phrenic Damage, Respiratory Rate, Motion of Fiducials, Tool Object Recognition, Collision Detection, Room Traffic Flow, Fatigue/Overload, Nociception Monitoring, Bed Sensors | ILR + AR and Haptics Feedback, Eye Tracking, Trajectory Coordinate Tracking | Merging Imaging and Other Sensor Data | Output of Acute and Chronic Outcomes + Feedback Loop |

As shown in Table 1 above, for the pulmonary procedure, the IA or EI ecosystem may utilize, for an integrated diagnostics system during the Pre-Operative Planning Stage, one or a combination of biometric input (including, but not limited to, information regarding at least one of age, weight, height, gender, race, etc.), morphology inputs (such as pulmonary history including, without limitation, difficulty breathing, shortness of breath, increase in exhalation/inspiration ratio, etc.), and/or a computed tomography ("CT") system or a magnetic resonance imaging ("MRI") system, and/or the like. In some cases, the IA or EI ecosystem may perform analysis of data obtained by these sensors, imaging systems, and/or tracking (or mapping and navigation) systems as well as user input to generate recommendations or to facilitate physician/user plans for the pulmonary procedure. The pulmonary procedure may then be performed based on sensor data, imaging data, tracking data, recommendations, and/or physician/user plans obtained or arising from the Pre-Operative Planning Stage.

During the Intra-Operative Adjustment Stage, the IA or EI ecosystem may combine (1) imaging device(s) including an electromechanical wave imaging ("EWI") ultrasound ("US") system, with (2) navigation/mapping system(s) including one or a combination of an optical-based tracking system merged with an electromagnetic ("EM") mapping and/or navigation system, a radio frequency identification ("RFID")-based tracking system merged with a 3D AR and/or US or EWI, with (3) sensor device(s) including one or a combination of a contactless optical-based tracking system, an infrared ("IR")-based tracking system for sensing temperature, a blood pressure sensor, a heart rate sensor, a motion sensor (e.g., to track motion from phrenic damage, or to a device that is configured to be introduced into a lumen in the body of a patient or subject, where a lumen refers to the cavity or channel within a tubular organ, such as a blood vessel (e.g., artery, vein, or capillary), esophagus, trachea, and intestine, etc.), eye tracking system for tracking physicians with XR headset relative to robotics for cognitive load and safety shut offs, and/or trajectory coordinate tracking of physical catheters relative to digital twins for replay, approach angle, etc., to relate back to outcomes, with (5) intra-operative AI and/or data analytics (i.e., real-time or near-real-time predictive and prescriptive analytics, etc.) that merges imaging and other sensor data to adjust device configurations, settings, and/or implementations in real-time (or near-real-time (e.g., within milliseconds or seconds, etc.)) based on any updates or changes to the sensor data, imaging data, tracking data, and/or recommendations obtained during the Intra-Operative Adjustments Stage. The ILR system may combine an intra-luminal robotic device with AR assistance and haptics feedback, particularly, for ablations that are in the realm of seconds.

In some embodiments, the merged imaging and other sensor data for the intra-operative AI and/or data analytics may include, without limitation, the following combinations: (a) spatial sensor data combined with ablation catheter itself and capital equipment time series data from sensors for temperature, voltage, current, and/or waveforms; (b) combination of ablation catheter and capital equipment data for electrical field proximity to targets with predictive analytics from image data merge and previous post-operative feedback loops; (c) auto-segmentation of anatomical imaging, object/feature recognition, trajectory recommendation to target and real-time tracking, 3D XR with catheter electrode proximity to location or gap, electrical field/cryo/heat growth, tagging of therapy, predictive denervation change to titer therapy dosage, proximity to adjacent anatomy (e.g., esophagus and phrenic nerve, etc.) with warnings to recommend approach and to titer therapy, and provide device and size recommendations; (d) XR headset eye tracking and robotic coordinates for safety, efficiency, and relationships with digital twins (e.g., "back-up camera" following moving anatomy that has real-time or near-real-time distance and auditory feedback until "docked"); or (e) facial and/or text recognition to anonymize people and/or documents; etc.

During the Post-Operative Monitory Stage, the IA or EI ecosystem may utilize the output of acute and chronic outcomes assessed per inputs from the Integrated Diagnostics, the Imaging Devices, Navigation/Mapping, and/or Sensor Devices (to track COPD exacerbation or recurrence, asthma, or the like). A feedback loop may be used to continually enhance predictive and prescriptive recommendations in real-time or near-real-time, with playback of trajectories and/or ablations, descriptive analytics, suggested morphologies from similar patients, literature, etc. In this manner, the combinations during all three stages (i.e., the Pre-Operative Planning Stage, the Intra-Operative Adjustment Stage, and the Post-Operative Monitory Stage) may achieve personalized trajectories and titered therapy for long term efficacy with minimal safety risk, while providing the user with efficient application of the therapy (i.e., reduced or consistent time and increased throughput) and extended career longevity (with no or low fluoro).

Figure 4:
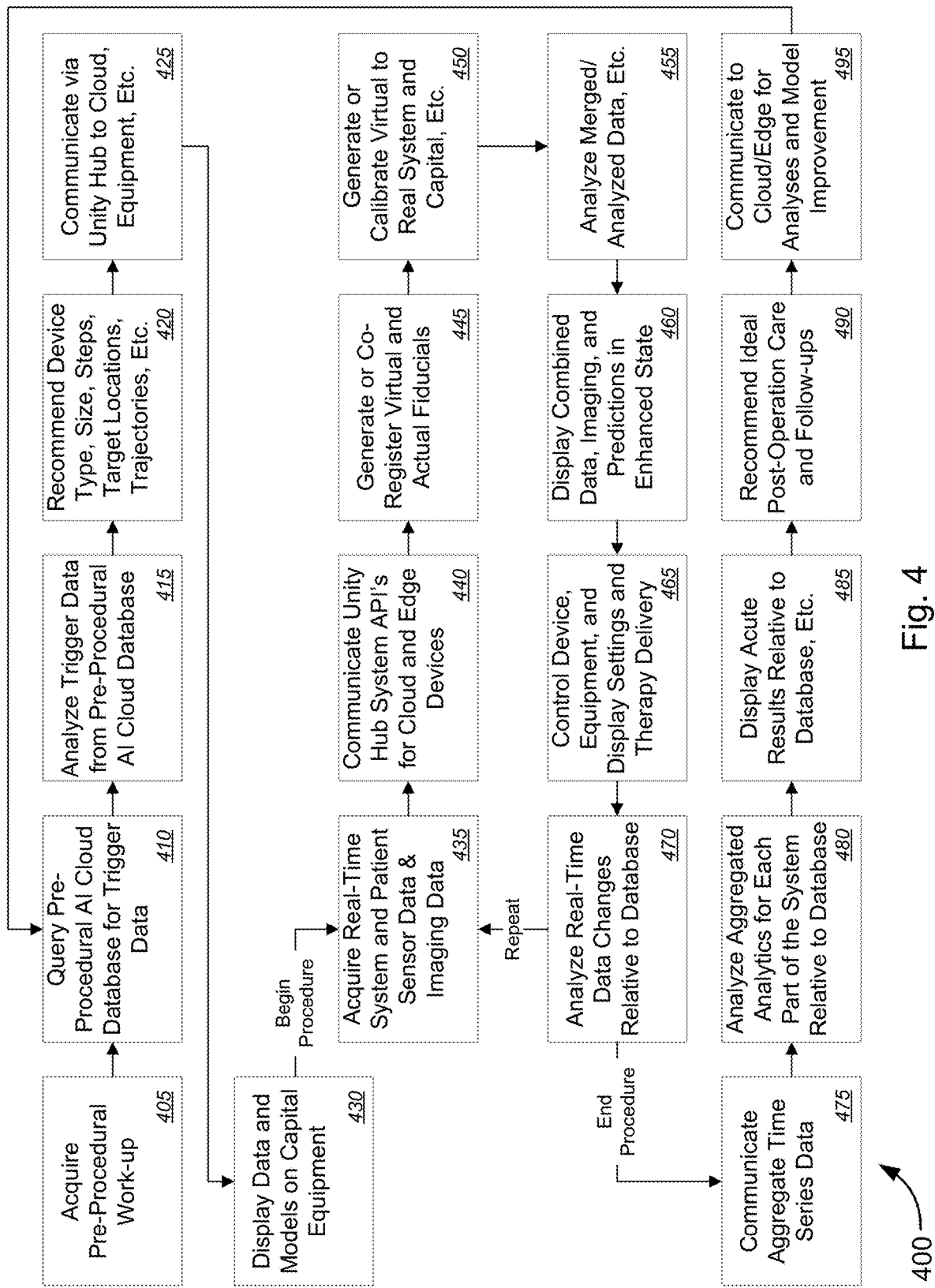
FIG. 4 is a flow diagram illustrating a method for implementing an IA ecosystem, in accordance with various embodiments.

FIG. 4 is a flow diagram illustrating a method for implementing an IA or EI ecosystem, in accordance with various embodiments.

In the non-limiting embodiment of FIG. 4, method 400 might comprise, at block 405, acquiring pre-procedural work-up, in some cases, including, but not limited to, ultrasound, computed tomography ("CT"), magnetic resonance imaging ("MM"), electrocardiogram ("ECG"), lifestyle, biometrics, or respiratory waveforms, and/or the like. At block 410, method 400 might comprise querying a pre-procedural artificial intelligence ("AI") cloud database for disease trigger data, including, but not limited to, data regarding anatomical morphology prognosis. Method 400, at block 415, might comprise analyzing the trigger data from pre-procedural AI cloud database, including, without limitation, feature recognition of likely targets.

Method 400 might further comprise, at block 420, recommending, predicting, or prescribing at least one of device type, size, procedural steps, target locations, trajectories, or statistical success rates of similar patients and procedures, and/or the like. In some cases, such recommendations might include, without limitation, pulmonary vein ablation catheter ("PVAC"), introducer sheath (e.g., 4F sized introducer sheath, or the like), array size, array orientation, proximity to target, Arctic Front Advance™ ("AFA") cryoablation catheter, introducer sheath (e.g., 12F sized introducer sheath, or the like), balloon size, compliance, or interface to contact, and/or the like.

At block 425, method 400 might comprise communicating the analyses and/or recommendations via, e.g., unity hub or similar system to cloud or edge data system, equipment, capital equipment, etc. Herein, 3D engine may refer to a platform (e.g., Unity® engine hub or Unreal Engine® hub, or the like) for creating and operating interactive, real-time 3D ("RT3D") content that integrates 3D models for a "scene" and software code (e.g., C#, C++, Python, etc.) that breathes life into features including, but not limited to, coloration, animation, user interfaces, collision detection, and/or other physics-based elements (e.g., the electric field for PFA, ice growth for cryoablation, cardiac electrical wave propagation, blood flow/pressure/velocity, etc.). The unity hub may refer to a standalone application that streamlines searching, downloading, and managing 3D engine projects and installations. The unity hub is the integration point of the real-world devices with the AR world, but can add data-related features to enhance the UI via AI or other algorithms, or the like. Herein, capital equipment may refer to equipment that is associated with therapy delivery (e.g., mapping and navigation equipment, ablation generators, etc.). In some cases, the capital equipment may provide information to/from the XR unity hub. Method 400 might further comprise displaying data and models on capital equipment, in some cases, projecting slaved imaged on at least one of one or more operating room ("OR") screens, one or more tablets, one or more extended reality ("XR") headsets, or one or more XR spatial projections, and/or the like (block 430). In some cases, the capital equipment might include, without limitation, a PFA console, a cryo or cryoablation console, or imaging modality and navigation, and/or the like.

The processes at blocks 405-430 might correspond to pre-procedural processes.

At block 435, method 400 might comprise acquiring system data, patient sensor data, and imaging data, one or more of which might be real-time or near-real-time data (where "near-real-time" herein may refer to within milliseconds or seconds, or the like). For example, auto-segmentation of an anatomy is beneficial in minutes compared to manual segmentation, but may need to be an order of magnitude better (i.e., faster) to drive real change—hence, "near-real-time" or millisecond or second data acquisition times. Also, when ablating, one may be moving the catheter within structures of the lung with a point-by-point or line catheter (e.g., the DiamondTemp catheter, or the like) while ablating with high power, so one needs to see the movement and interaction with minimal lag. In some embodiments, the system data and patient sensor data might include, without limitation, optical data, doppler flow data, pressure data, respiration data, ECG data, neurological event data, navigation coordinate data, and/or the like. According to some embodiments, the imaging data might include, but is not limited to, electromechanical wave imaging ("EWI") data and/or ultrasound data, and/or the like.

Method 400, at block 440, might comprise communicating unity hub system application programming interfaces ("API's") for cloud and edge devices, in some cases, as the acquired data are merged. Method 400 might further comprise generating or co-registering virtual and actual fiducials, in some cases, via at least one of digital imaging and communications in medicine ("DICOM") files, headset mapping and/or photogrammetry, skin patches, reflective infrared markers, impedance, electromagnetic, or radio frequency identifiers ("RFIDs"), and/or the like (block 445). Herein, the term fiducials may refer to an object that is placed in the field of view of an imaging system that appears in the produced image as a point of reference or a measure, and/or to landmarks (whether anatomical or other) that are employed to co-register the digital world with the real world.

Method 400 might further comprise, at block 450, generating or calibrating virtual to real (or physical or non-digital) device and capital, target anatomy, adjacent structures, tissue selectivity, safety shut-offs (e.g., no delivery without focused eye gaze), etc. At block 455, method 400 might comprise analyzing merged or analyzed data, predictions, prescriptions, real-time flow changes and/or pressure changes, and/or the like, as it relates to device location and therapy delivery. Method 400, at block 460, might comprise displaying combined data, imaging, and predictions in enhanced state, in some cases or preferably, via XR spatial projections or headset. Herein, enhanced state may refer to the state in which information that is presented to the user (such as the combined data, imaging, and predictions, or the like, as preferably displayed via the XR spatial projections or headset) exceed what would normally be perceived by the unaided human eye alone. In some cases, the enhanced state may refer to enhancements to the unaided human senses in addition to visual enhancements as described above, including, but not limited to, auditory enhancements (e.g., surround sound, voice commands, auditory information presentation, etc.), haptic-like feedback (e.g., haptic feedback for robotic or instrument control when interacting with objects or tissue, etc.), or the like.

Method 400 might further comprise controlling device, robotics, capital equipment settings, therapy delivery through system interaction, including, but not limited to, voice commands, eye gaze, virtual buttons, virtual triggers, electrocardiogram ("ECG") gating, AI algorithm, etc., by one or more team members within the operating room or remotely (block 465). Method 400 might further comprise, at block 470, analyzing data changes—including, without limitation, at least one of pressure, flow, EAM changes via CIT vest and/or US/EWI, transient ischemic attack ("TIA"), biometric data, and/or the like, relative to database. In some instances, the data changes might be real-time or near-real-time data.

Based on the analysis (at block 470), method 400 either might continue onto the process at block 475 or might return to the process at block 435. The processes at blocks 435-470 might correspond to intra-procedural processes.

At block 475, method 400 might comprise communicating aggregate time series data via the hub system to cloud or edge data system, equipment, capital equipment, etc. Method 400, at block 480, might comprise analyzing the aggregated analytics for each part of the system relative to database. Method 400 might further comprise, at block 485, displaying acute results relative to database, predicted long term success, three-dimensional ("3D") replays, four-dimensional ("4D") replays (i.e., 3D replays plus at least one of real-time updates, dynamic modeling, or data streaming, and/or the like), statistical dashboards, etc., in paper, two-dimensional ("2D") digital, interactive 3D digital, and/or extended reality ("XR") format, or the like. Method 400 might further comprise recommending ideal post-procedural care and follow-ups for value-based healthcare (block 490). Herein, value-based healthcare may refer to a framework for restructuring healthcare systems with the principal goals of health outcomes per unit costs (i.e., value) for patients. At block 495, method 400 might comprise communicating, de-identifying, and sending back to the cloud or edge data system for analyses and model improvement. Method 400 might return to the process at block 410. The processes at blocks 475-495 might correspond to post-procedural processes.

Figure 5A:
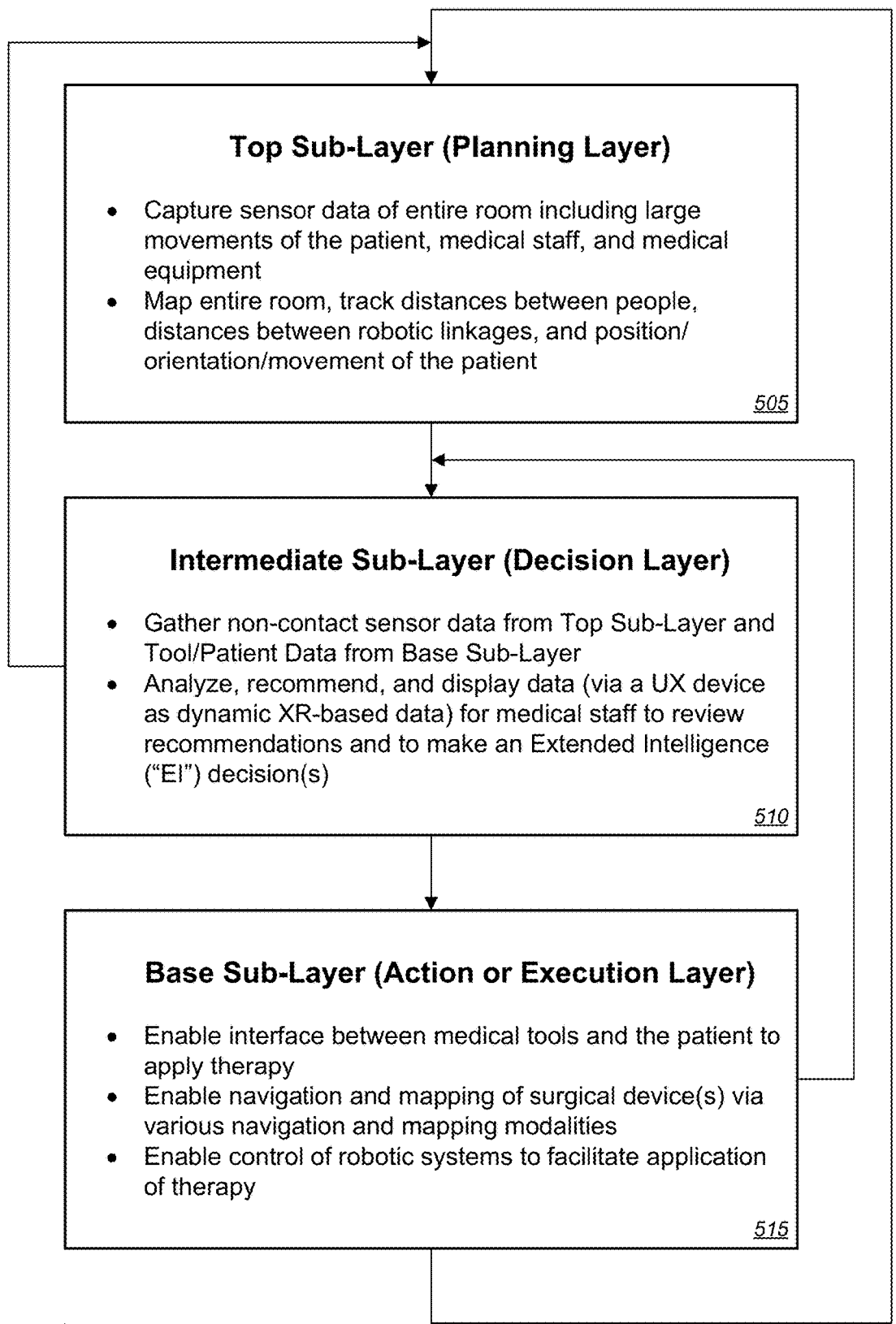
FIG. 5A is a flow diagram illustrating a non-limiting example of feedbacked interactions among three sub-layers of imbedded and contactless sensors, data, and vision systems that may be used as part of an IA or EI ecosystem implementation for pulmonary procedures, in accordance with various embodiments.
Figure 5B:
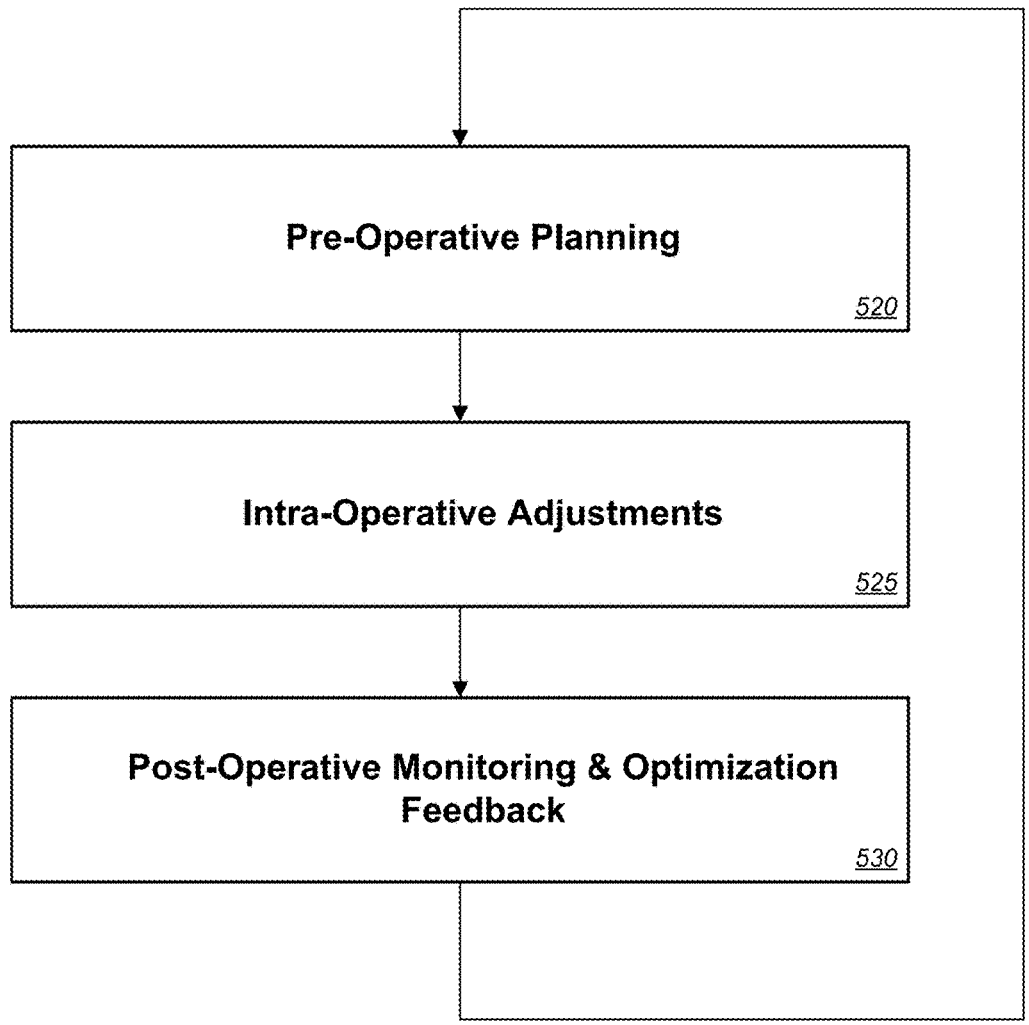
FIG. 5B is a flow diagram illustrating a non-limiting example of interactions among "pre-operative planning,"

FIG. 5A is a flow diagram illustrating a non-limiting example 500 of feedbacked interactions among three sub-layers of imbedded and contactless sensors, data, and vision systems that may be used as part of an IA or EI ecosystem implementation for pulmonary procedures, in accordance with various embodiments. FIG. 5B is a flow diagram illustrating a non-limiting example 500' of interactions among "pre-operative planning," "intra-operative adjustments," and "post-operative monitoring" with an optimization feedback loop, in accordance with various embodiments.

With reference to the non-limiting example 500 of FIG. 5A, the IA or EI ecosystem for implementing pulmonary procedures may employ three sub-layers of imbedded and contactless sensors, data, and vision systems working together in a feedback loop, the three sub-layers including, without limitation: (1) Top Sub-Layer (or Planning Layer) 505, (2) Intermediate Sub-Layer (or Decision Layer) 510, and (3) Base Sub-Layer (or Action Layer or Execution Layer) 515. These various sub-layers feedback on each other (as depicted in FIG. 5A by the arrows connecting one sub-layer to another and back again).

According to some embodiments, the Top Sub-Layer (Planning Layer) 505 represents a high level layer that captures the entire room including large movements of the patient, medical staff, and medical equipment such as the robotic linkages and delivery system. This can be done by multiple techniques together or separately, including, but not limited to, infrared and photogrammetry techniques. For example, one or more depth cameras (e.g., Kinect depth cameras, or the like) may be used to map the entire room, to track distances between users, to track distances between robotic linkages, and to track position(s), orientations(s), and/or movement(s) of the patient. Algorithms with known degrees of freedom of each of these can determine the range of motion, and machine learning simulations can recommend a location(s) of each in real-time or near-real-time. This can then be displayed on the Intermediate Layer 510 for the user(s) or medical professional(s) to take action via the Base Layer 515.

Information and/or outcomes facilitated by the Top Sub-Layer 505 may include, without limitation, (a) equipment and/or robotic system setup monitoring and suggestions to the next layer (which may aid in robot and human collision predictions and warnings, enabling optimized robot set-ups for patient-specific target anatomy and maximum workspace, or the like); (b) staff location and workflow monitoring (including ensuring social distancing protocols are met, producing performance metrics of the procedure (e.g., time taken for each sub-task in the procedure, those involved, the order of the tasks, etc.), linking performance metrics to a range of outcomes and providing feedback to the medical professionals, or the like); (c) obtaining or generating port (or surgical device placement) locations, setup, monitoring, and/or suggestions, or the like; (d) monitoring patient posture, respiration, shifting positions, or the like; (e) monitoring biometrics of patient and/or staff (including, but not limited to, temperature, heart rate, oxygen level, respiratory rate, etc.); (f) monitoring staff safety via vision tracking or the like (in some cases, via facial recognition AI techniques) to ensure safety protocols are met (including, but not limited to, proper face mask wearing, sterile fields, identification of all equipment and disposables, etc.); (g) tracking cell operating system ("COS") layouts and traffic flow (i.e., using spatial mapping, or the like); (h) producing workflows for equipment and staff (in some cases, displayed in heat maps and pathways, or the like); (i) automating documentation while blurring out or redacting private areas of text and facial features, or the like; and/or the like.

In some instances, modular design of the robotics system or platform (e.g., the Hugo robotics platform, or the like) may enable integration across broad therapeutic areas, including endoluminal procedures, or the like. In some embodiments, the robotics system or platform may include, without limitation, at least one of handheld robotic accessories, robotics integrated into the handle, a table-top robotics, or large robotics capital equipment, and/or the like. The surgeon console and visualization tower may be used for endoluminal cases, paired with a modified arm cart with an adapter for steerable guide catheters. Other arm carts may be equipped with companion therapeutic and diagnostic tools. Robotic solutions may include, without limitation, at least one of motion compensation, force feedback, force control, image guidance, or endoluminal catheter delivery, and/or the like. Regarding motion compensation, the robot may automatically control the end effector to synchronize with cyclic motion due to heart or respiratory motion. The robot may detect the cyclic motion and may respond accordingly to synchronize its motion to the motions of the tissue structures. The cyclic motion can also be estimated using Kalman filtering techniques or using machine learning approaches by integrating post-op sensor data, or the like. Regarding force feedback, the manipulator (i.e., end effector and/or catheter body) may sense contact forces (in multiple degrees-of-freedom) with the environment (e.g., tissue structures) and may provide feedback to the surgeon via haptics, AR visual cues, auditory tones, or other means, etc. Regarding force control, the robot software controls may be used to regulate forces applied to the environment by the robot (e.g., maintaining exactly 1 N of force on the endoluminal surface by a guide catheter, etc.). Regarding image guidance, imaging systems (e.g., ultrasound probe on a catheter with display integrated with the surgeon console and tower) in conjunction with computer vision algorithms may be used to automatically guide the robot's motion and/or trajectory in real-time. These algorithms may be enhanced by combining with pre-op image scans and post-op robot kinematic data. Variations of ultrasound imaging such as EWI and Photoacoustic Imaging may further enhance such integration. Regarding endoluminal catheter delivery, combining device positional tracking (e.g., EM) and anatomical imaging (e.g., MRI, CT, fluoroscopy, ultrasound, etc.), a modified cart arm may automatically advance guide catheters, access tools, and therapy delivery tools into the patient anatomy (such as the bronchi of the lungs), potentially eliminating need of a bronchoscope, which limits device size and performance due to working channel diameter and length.

In some embodiments, the Intermediate Sub-Layer (Decision Layer) 510 represents decision-making tools that provide the interface and feedback loop(s) between the user(s) or medical professional(s), the equipment, and the devices. For example, this layer may be used to gather non-contact sensor data from the Top Sub-Layer 505 and tool and/or patient data from the Base Sub-Layer 515, then to analyze, recommend, and display for the user(s) or medical professional(s) to make an Extended Intelligent ("EI") decision(s). These recommendations can come with displayed boundaries and/or guides, probability of success, recommended similar cases/approaches/outcomes for reference, etc. This will allow the user(s) or medical professional(s) to interact with a virtual mockup of the system, to move around components of the system, to compare options to optimize, and/or to verify placement once moved, and/or the like.

Features of the Intermediate Sub-Layer may include, without limitation, (a) visualizing and integrating 3D anatomical structures in near-real-time (i.e., in 4D) at this level in many ways, including, but not limited to, via a mapping vest (e.g., an electrocardiogram ("ECG") sensor belt or CardioInsight™ ("CIT") mapping vest, or the like), magnetic resonance imaging ("MRI"), or via electromechanical wave imaging ("EWI") ultrasound, or the like; (b) enabling equipment setup, including virtual overlays of base and articulating sections; (c) providing remote assistance, tele-mentoring, and tele-surgery via display (where the display and control may be through multiple modalities, including, but not limited to, headsets, laptops, phones, tablets, command center, etc.); (d) utilizing imbedded sensors—including, but not limited to, microelectromechanical system ("MEMS")-based sensors, vibration sensors, rotation sensors, acceleration sensors, temperature sensors, etc.—to provide immediate feedback loop(s) for highlighting and/or addressing concerns such as robotic arm and/or human collisions, or for otherwise aiding in validating non-contact sensing, or the like; (e) integrating XR analytics data sources and machine learning including security and privacy (e.g., blurring out faces of patients, physicians, staff, etc., using facial recognition techniques; blurring out or redacting personal, patient or healthcare-related data, etc., in written documents using object recognition techniques; and/or the like); and/or the like. In some cases, machine learning methods for visual tracking, human pose estimation, human-object interaction models, tool tracking, estimate durations of activities, suggested tool types, procedure techniques, recovery planning, and change-over for next procedure(s) may include, but are not limited to, (i) predictive movements from Convolutional Neural Network and Fully Connected Networks, or the like; (ii) Sequential decision-making such as Markov Decision Process ("MDP"), or the like; and/or (iii) AI or machine learning inputs (including, without limitation, at least one of periods of apnea, apnea type central or obstructive, tidal volume real-time changes, tidal volume absolute value, oxygen saturation level (arterial, venous, or mixed) in either absolute value or trending value over time, etc.).

In some instances, systemic injection of fluorescing agents may be used to selectively bind to targeted structures enhancing their visualization, which may be fed into the Intermediate Sub-Layer (or Decision Layer). For example, injected molecules could target the vagus nerve for lung denervation and may be energized with near-IR ("NIR") light source on a bronchoscope or catheter placed into the bronchi. The fluorescing emission from nerves surrounding the bronchi could then be detected with a camera coupled with a NIR notch filter residing on the bronchoscope or catheter. The NIR video may be processed to add nerve visualization overlays onto a visible light video feed from the bronchoscope or catheter. With clear visualization of nerve location, denervation therapy may be precisely deployed at the nerves.

According to some embodiments, the Base Sub-Layer (Action Layer) 515 represents medical tools interfacing with the patient to apply therapy. The three sub-layers may have overlapping functions and can calibrate and/or validate each other throughout the procedure.

Some features of the Base Sub-Layer may include, without limitation, (a) providing navigation and mapping of surgical devices, using optical-based, RFID-based, electromagnetic-based, impedance-based, Bluetooth-based, RF-based, and/or ultrasound-based navigation and mapping functionalities; (b) enabling a shared session across multiple locations that may be employed by multiple devices and/or platforms; (c) enabling virtual and/or augmented reality display at procedure location or at a separate location for tele-mentoring and/or tele-surgical control (i.e., where interaction with the virtual display can physically control the surgical device(s)), and, in some cases, utilizing haptic feedback within the control center and/or gloves of the user(s) or medical professional(s) to achieve more realistic feedback loop(s) and optimal outcome(s); (d) utilizing multiple modalities for device tracking, with near-real-time recommendations of therapy target being displayed in augmented reality via feedback loop of the system, where the feedback loop may be used to predict and track catheter trajectories, angles, distance to target, etc.; (e) using nociception monitoring sensors for enabling integrated closed-loop systems within the EI ecosystem for administration of analgesics, identification of patients with higher likelihood for severe post-operative pain, determination of levels of nociception as the procedure takes place, informing medical professionals that additional analgesics may be required (e.g., during incision or ablation tasks, etc.) and/or sending a signal to an analgesic pump to automatically titrate more drugs into the patient during the procedure. In some instances, other features that may be displayed for better decision-making may include, but are not limited to, (i) displaying how the lung breaks out into branches; (ii) sparing and/or capturing common left and right branches, paths of nerve of circuitry, etc.; (iii) displaying in 3D both predicted trajectories (whether based on predictions via AI or based on annotations of the user's or medical professional's own pathway) and tracked (or actual) trajectory; and/or the like. In some cases, the EI ecosystem may utilize yet another layer and feedback loop in the form of an XR integration with the patient (e.g., enabling the patient to wear an XR headset during a procedure to reduce pain (instead of or via use of less medication) and/or to communicate with and/or see what the medical professional is doing (such as in the case of difficult child birth or brain surgery where the headset sensors can be implemented (for eye tracking, speech recognition, etc.).

Referring to the non-limiting example 500' of FIG. 5B, the IA or EI ecosystem for implementing pulmonary procedures may additionally employ the following three stages: (1) a Pre-Operative Planning Stage 520; (2) an Intra-Operative Adjustments Stage 525; and (3) a Post-Operative Monitoring and Optimization Feedback Stage 530. The process may start at the Pre-Operative Planning Stage 520, then proceed to the Intra-Operative Adjustments Stage 525, subsequently proceed to the Post-Operative Monitoring and Optimization Feedback Stage 530, and loop back (as necessary) to the Pre-Operative Planning Stage 520, with the cycle looping as many times as required or as desired to ensure continued optimization of the pulmonary procedures.

At the Pre-Operative Planning Stage 520, the IA or EI ecosystem may collect sensor data from one or more sensors (e.g., imaging system(s) 140, 245, and 335, sensor(s) 145, 250, and 325-335, etc. of FIGS. 1-3, or the like, which are discussed in detail above). In some cases, the IA or EI ecosystem may perform at least one of the functions of the Top Sub-Layer (Planning Layer) 505 as well as at least one of the functions of the Intermediate Sub-Layer (Decision Layer) 510, as discussed above with respect to FIG. 5A. The pulmonary procedure, as discussed herein, may then be performed based on sensor data, recommendations, and physician plans obtained or arising from the Pre-Operative Planning Stage 520.

During the procedure itself, at the Intra-Operative Adjustments Stage 525, the IA and EI ecosystem may continue to collect sensor data from the one or more sensors, and may perform at least one of the functions of the Base Sub-Layer (Action or Execution Layer) 515 as well as at least one of the functions of the Intermediate Sub-Layer (Decision Layer) 510, as discussed above with respect to FIG. 5A. Adjustments to the delivery of the CIED placement may be implemented in real-time based any updates or changes to the sensor data and recommendations obtained during the Intra-Operative Adjustments Stage 525.

Following a predetermined time period after the pulmonary procedure (e.g., 30 days, 60 days, and/or 90 days, or the like), the Post-Operative Monitoring and Optimization Feedback Stage 530 may be performed. At the Post-Operative Monitoring and Optimization Feedback Stage 530, the IA and EI ecosystem may collect sensor data from the one or more sensors, and may once again perform the at least one of the functions of the Top Sub-Layer (Planning Layer) 505 as well as the at least one of the functions of the Intermediate Sub-Layer (Decision Layer) 510, as discussed above with respect to FIG. 5A. In some cases, the IA and EI ecosystem may perform a different set or combination of functions of each of the Top Sub-Layer (Planning Layer) 505 and/or the Intermediate Sub-Layer (Decision Layer) 510. The IA and EI ecosystem may determine based on the sensor data and recommendations obtained or arising from the Post-Operative Monitoring and Optimization Feedback Stage 530 whether there has been a change or a difference in the sensor data, and, if so, whether the change or difference is indicative of a positive change (e.g., an expected, successful positioning of a catheter toward one or more targeted locations within the lung to perform COPD treatment, resulting in good results being obtained from ablation of the one or more targeted locations using the catheter, without adverse signs of stress or injury in the patient's body, or the like) or a negative change (e.g., where an issue arises from one or more of improper positioning of the catheter within the lung, results not being properly obtained from ablation of portions of the lung, and/or adverse signs of stress or injury in the patient's body are observed, or the like). The operations of the Post-Operative Monitoring and Optimization Feedback Stage 530 may be performed repeatedly over a predetermined period (e.g., every day for a week, or the like), which may also be repeated the following one or more months. Based on the sensor data results and recommendations obtained during the Post-Operative Monitoring and Optimization Feedback Stage 530, the process may loop back to the Pre-Operative Planning Stage 520, the Intra-Operative Adjustments Stage 525, and the Post-Operative Monitoring and Optimization Feedback Stage 530 during a follow-on pulmonary procedure (or correction procedure), or the like.

FIGS. 6A-6K (collectively, "FIG. 6") illustrate various non-limiting examples 600 of sensors, respiratory conditions, lung analyzers, trajectory of a surgical device within a lung, and robotics for controlling positioning of the surgical device within the lung that may be part of implementation of an IA or EI ecosystem for pulmonary procedures, in accordance with various embodiments.

Figure 6A:
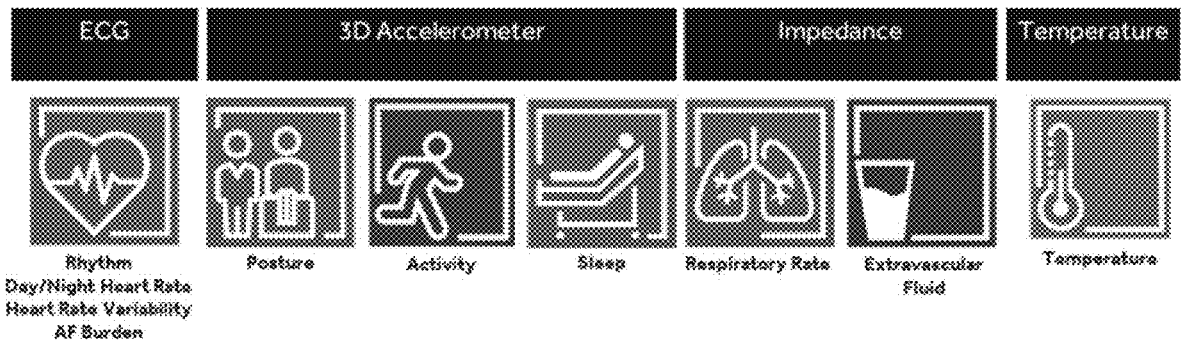
Figure 6B:
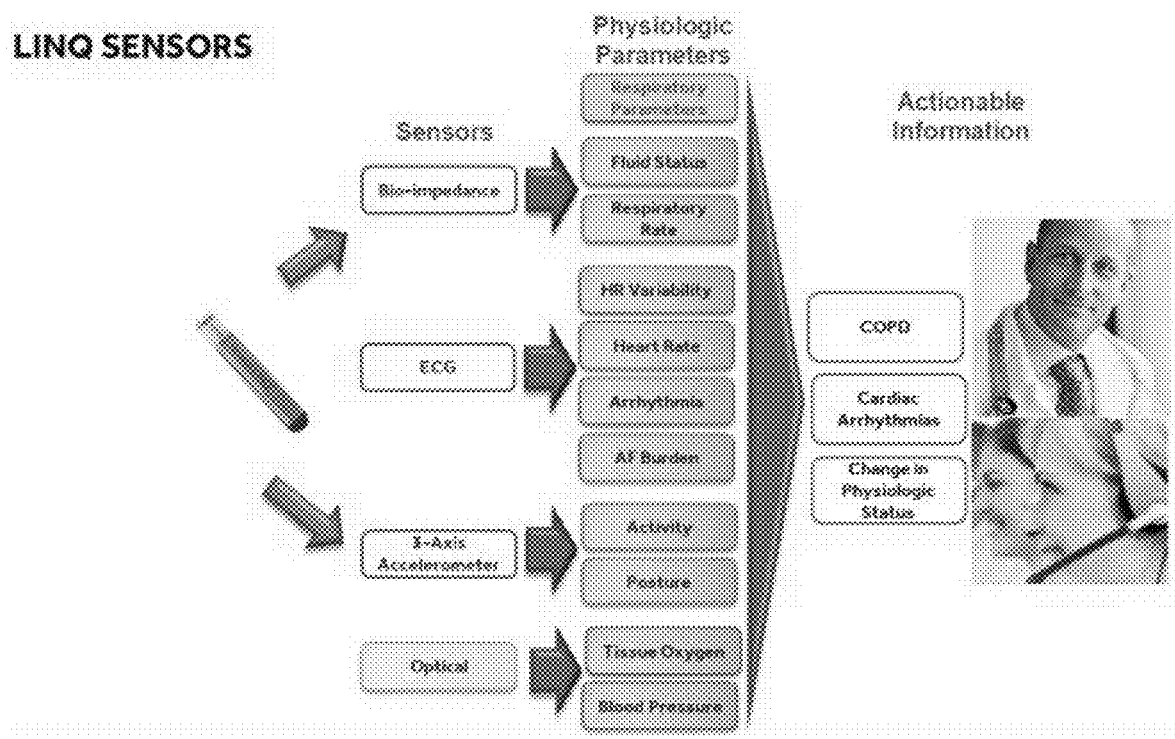

FIG. 6A depicts a set of sensor capabilities (including, but not limited to, at least one of heart rate and heart rate variability, posture, activity, sleep, respiratory rate, extravascular fluid, or temperature, and/or the like) of a series of sensors referred to herein as "Ling sensors." FIG. 6B depicts a breakdown of a set of Linq sensors (including, without limitation, bio-impedance sensors, ECG sensors, a 3-axis accelerometer, optical sensors, etc.) and their corresponding physiological parameters (i.e., respiratory parameters, fluid status, and/or respiratory rate for the bio-impedance sensors; heart rate variability, heart rate, arrhythmia, and/or atrial fibrillation ("AF") burden for the ECG sensors; activity and/or posture for the 3-axis accelerometer; tissue oxygen and/or blood pressure for the optical sensors; etc.), and resultant actionable information output (including, but not limited to, COPD, cardiac arrhythmias, change in physiologic status, etc.). FIG. 6C lists signs and symptoms of respiratory conditions, including, without limitation, at least one of congestive heart failure ("CHF") decompensation, COPD exacerbation, pneumonia, or asthma, and/or the like, that may be detected using the Linq sensors. FIG. 6D depicts time series Linq sensor data relative to physiologic parameters that may be used to identify a disease signature.

Figure 6E:
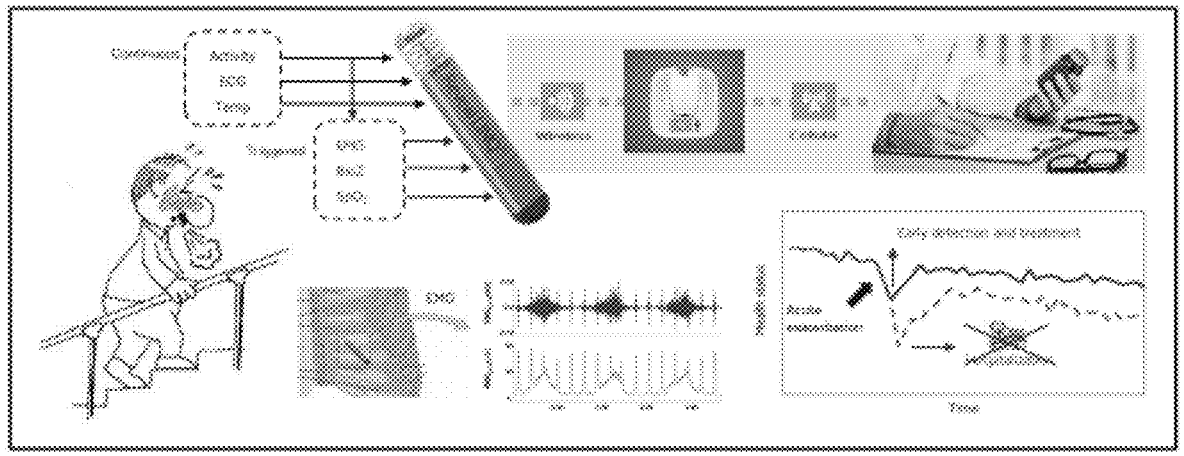
Figure 6F:
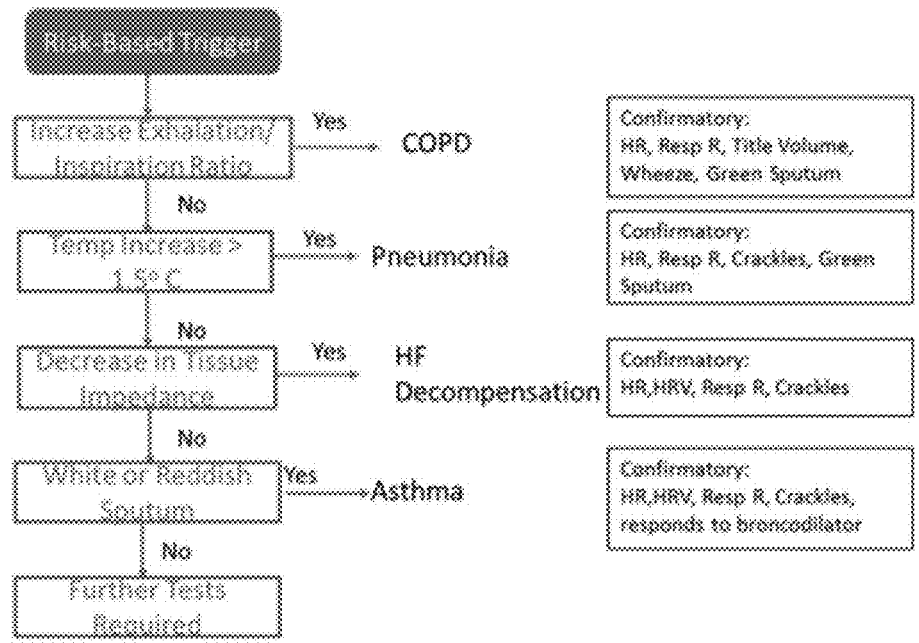
Figure 6G:
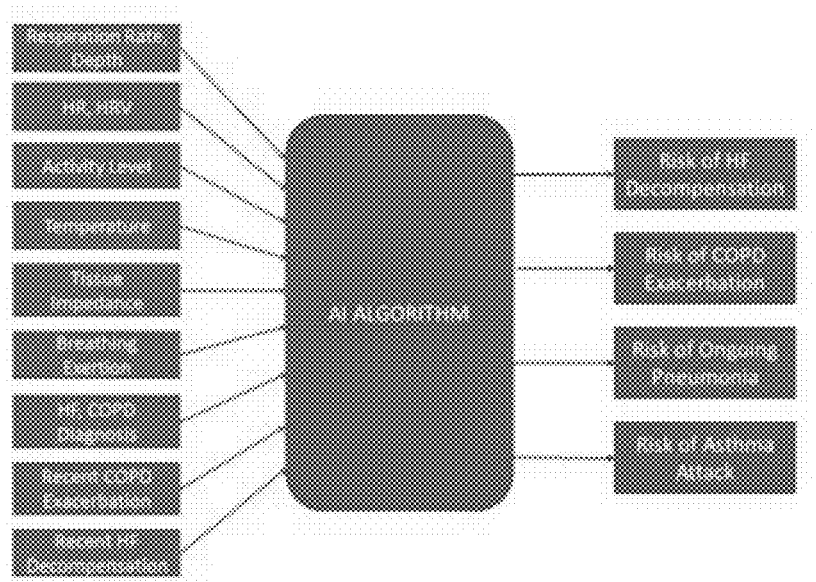
Figure 6H:
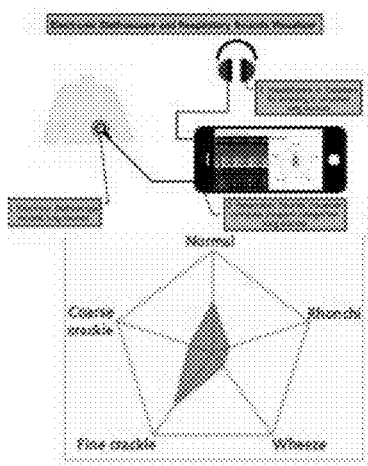
Figure 6H:
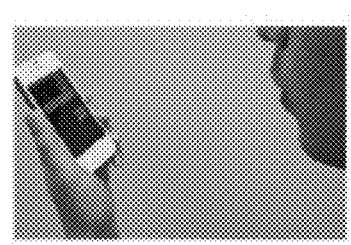
Figure 6H:
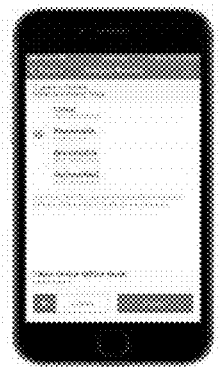

FIG. 6E depicts operation of the Linq feedback and referral loop for objectively monitoring COPD symptoms of a patient during daily life, in some cases, based on automated measurements of physiological variable during and/or after activities as well as electromyography ("EMG") measurements of respiratory muscles (which may provide an objective measure of dyspnea). Such feedback monitoring enables early detection and prompt treatment, thereby reducing the risk of hospitalization, thus improving recovery and quality of life for the patient. FIG. 6F depicts operation of the Linq feedback and referral loop for performing differential diagnosis for respiratory conditions (including, but not limited to, COPD, pneumonia, HF decompensation, or asthma, etc.). FIG. 6G depicts operation of the Linq feedback loop, based on sensor data and AI analytics, for performing differential diagnosis for respiratory conditions (including, but not limited to, COPD, pneumonia, HF decompensation, or asthma, etc.). FIG. 6H depicts operation of the Linq feedback loop, based on sensor data and AI analytics, for performing lung sound and cough analysis. In some embodiments, diagnostic metrics that predict a possible worsening of a disease state (e.g., COPD, pneumonia, HF decompensation, or asthma, etc.) may then be used to recommend open loop or provide closed loop clinical interventions, including pharmacological interventions in the acute setting to prevent or manage symptoms, and then chronic pharmacological or procedural interventions to prevent future acute exacerbations from happening.

Figure 6I:
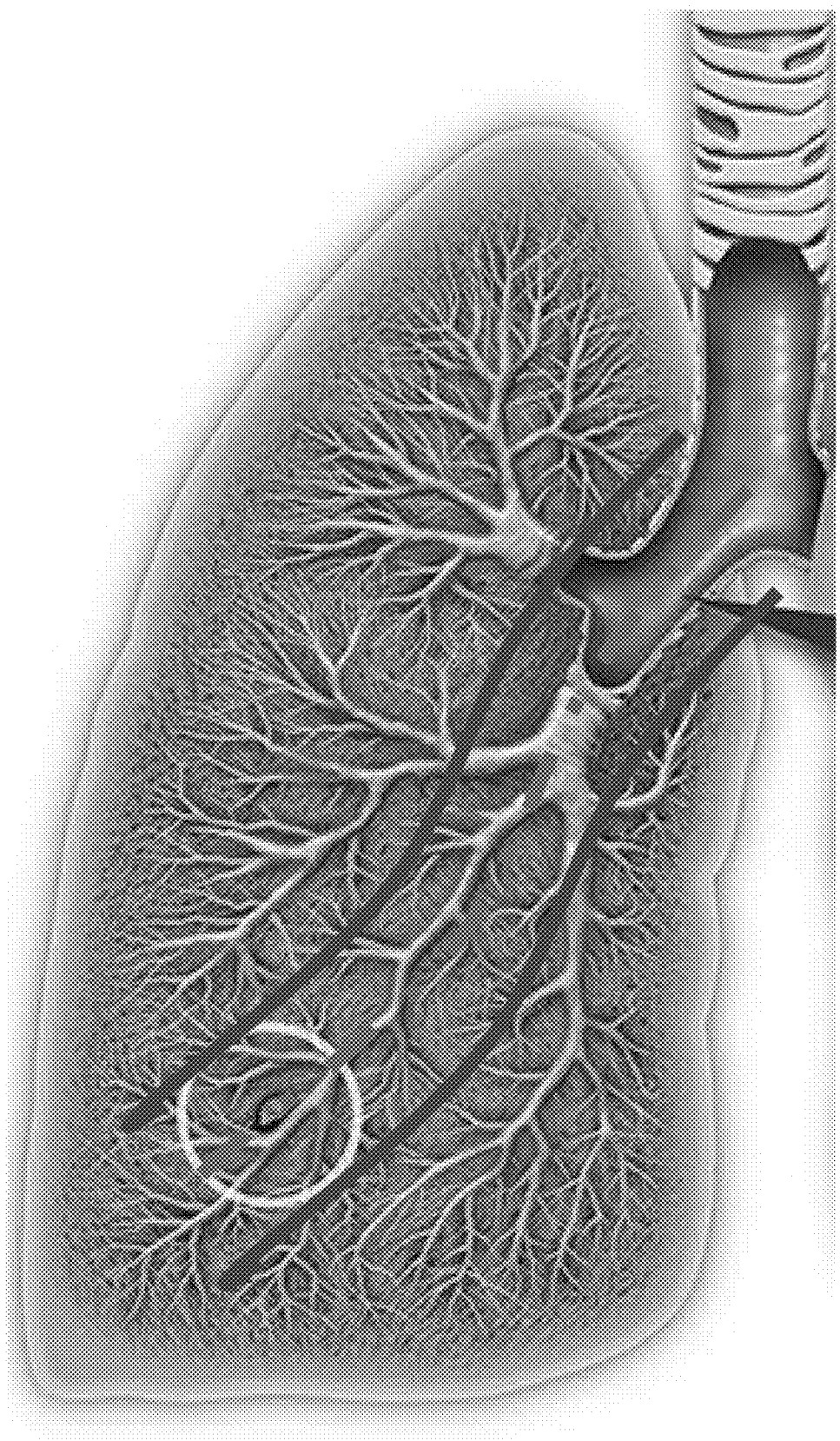

FIG. 6I depicts an example of a lung lesion target that can be inputted in real time via AI, visualized in 3D via XR, navigated to via EM or similar sensors, with electrical conduction changes being measured and/or displayed immediate for decisions by medical professionals.

Figure 6J:
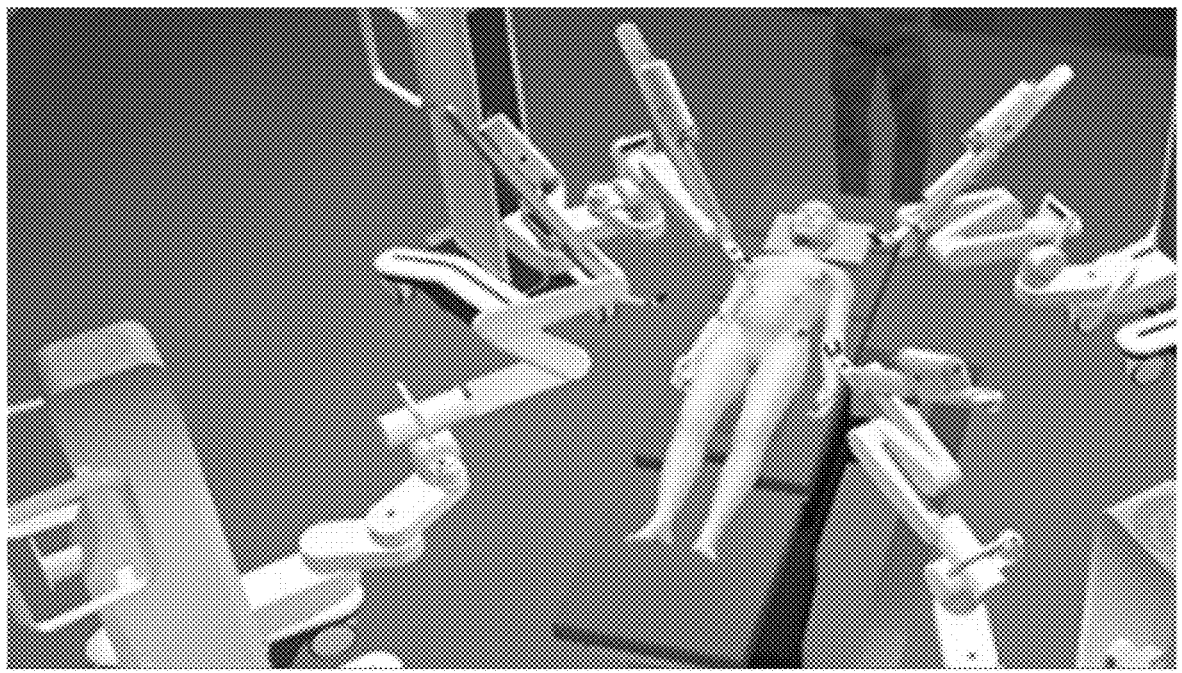
Figure 6K:
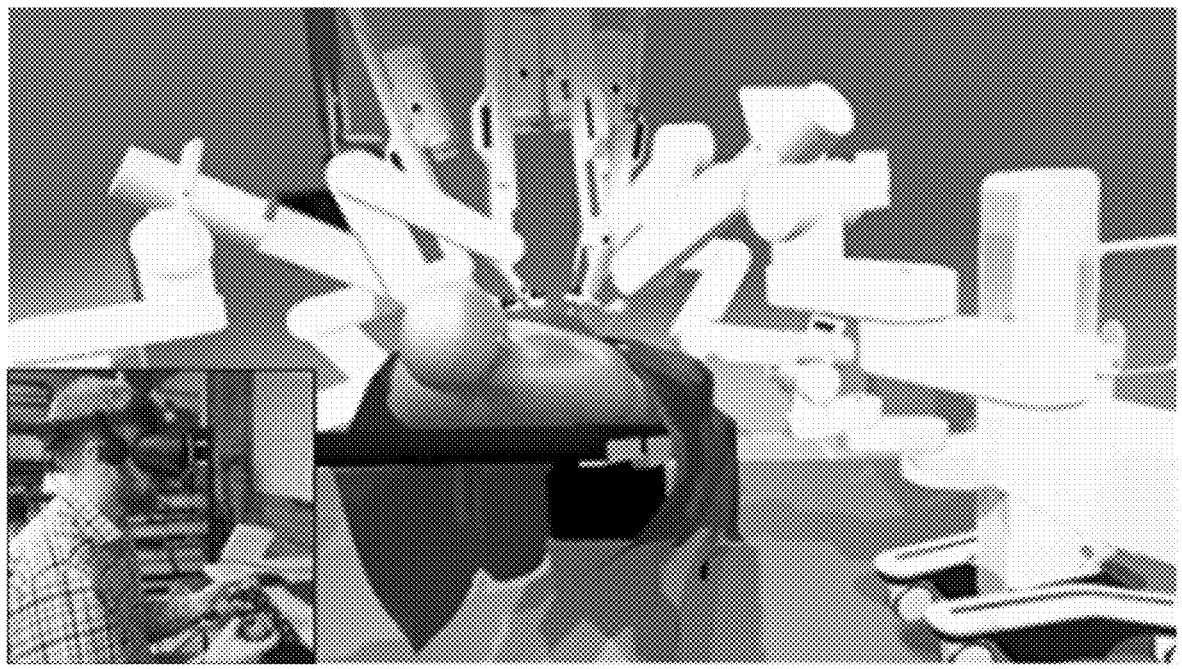

FIGS. 6J and 6K depict non-limiting examples of images that may be presented on a two-dimensional ("2D") display and a three-dimensional ("3D") display, respectively, as part of a display output for an IA or EI ecosystem implementation for pulmonary procedures, in accordance with various embodiments. As shown in FIGS. 6J and 6K, the IA or EI ecosystem provides or presents a user or medical professional with XR images (as described in detail above with respect to the embodiments of FIGS. 1-5, or the like), and may be displayed as a 2D display (e.g., on a laptop, monitor, or other screen display/projection, or the like) (as shown in FIG. 6J) or as a 3D display (e.g., via VR, AR, MR, and/or XR devices (e.g., UX devices), or the like) (as shown in FIG. 6K). Although FIGS. 6J and 6K depict the room-view, the various embodiments are not so limited, and the IA or EI ecosystem may provide or present the user or medical professional with XR-image-based overlays, cutouts, or other 2D, 3D, and/or 4D representations of the lung, targeted portions of the lung, trajectories, and planned outlines of the pulmonary procedure, so as to enable the user or medical professional to more easily and accurately achieve BBBP CIED placement, or any other cardiac (or non-cardiac) medical procedures, or the like.

FIGS. 7A-7D (collectively, "FIG. 7") are flow diagrams illustrating a method 700 for implementing an IA or EI ecosystem for pulmonary procedures, in accordance with various embodiments. Method 700 of FIG. 7A continues onto FIG. 7B following the circular marker denoted, "A," continues onto FIG. 7C following the circular marker denoted, "B," and/or continues onto FIG. 7D following the circular marker denoted, "C."

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems, examples, or embodiments 100, 200, 300, 400, 500, 500', and 600 of FIGS. 1, 2, 3, 4, 5A, 5B, and 6, respectively (or components thereof), such methods may also be implemented using any suitable hardware (or software) implementation. Similarly, while each of the systems, examples, or embodiments 100, 200, 300, 400, 500, 500', and 600 of FIGS. 1, 2, 3, 4, 5A, 5B, and 6, respectively (or components thereof), can operate according to the method 700 illustrated by FIG. 7 (e.g., by executing instructions embodied on a computer readable medium), the systems, examples, or embodiments 100, 200, 300, 400, 500, 500', and 600 of FIGS. 1, 2, 3, 4, 5A, 5B, and 6 can each also operate according to other modes of operation and/or perform other suitable procedures.

Figure 7A:
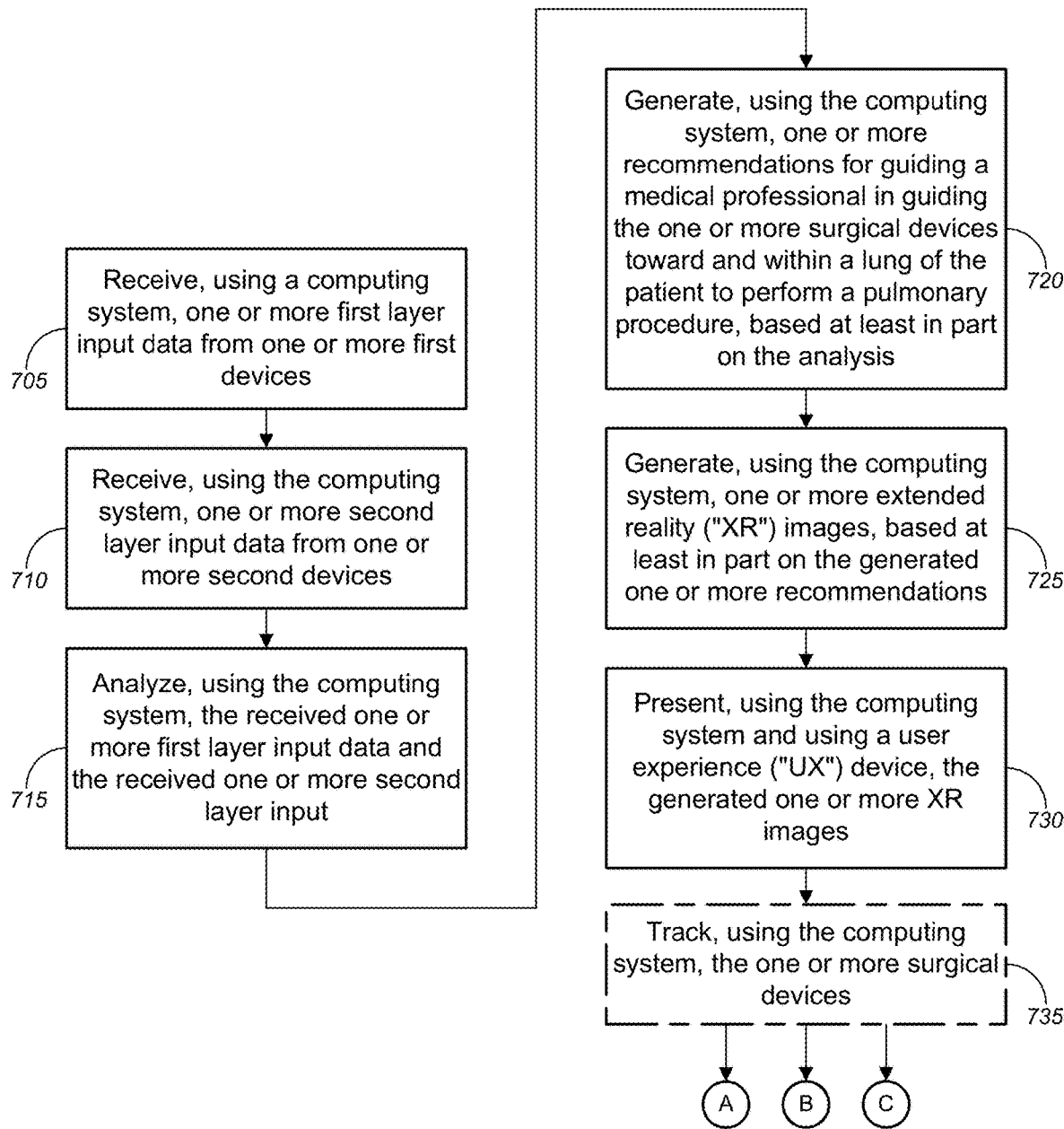

In the non-limiting embodiment of FIG. 7A, method 700, at block 705, may comprise receiving, using a computing system, one or more first layer input data from one or more first devices, the one or more first layer input data comprising at least one of movement data, position data, relative distance data, or externally observable data for each of one or more persons and one or more objects within a room, and/or the like.

At block 710, method 700 may comprise receiving, using the computing system, one or more second layer input data from one or more second devices, the one or more second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient.

Method 700 may further comprise, at block 715, analyzing, using the computing system, the received one or more first layer input data and the received one or more second layer input.

Method 700 may further comprise generating, using the computing system, one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient (block 720); generating, using the computing system, one or more extended reality ("XR") images, based at least in part on the generated one or more recommendations (block 725); and presenting, using the computing system and using a user experience ("UX") device, the generated one or more XR images (block 730).

In some embodiments, the computing system may correspond to (or may include) the system hub or computing system 105a or 105b of system 100 of FIG. 1, or the like. According to some embodiments, the one or more devices may correspond to (or may include) the one or more devices or equipment 135 of system 100 of FIG. 1, or the like. In some instances, the one or more imaging systems may correspond to (or may include) the one or more imaging devices or systems 140 of system 100 of FIG. 1, or the like. In some cases, the one or more imaging systems may correspond to (or may include) the one or more imaging devices or systems 140 of system 100 of FIG. 1, or the like. In some instances, the UX device may correspond to (or may include) the UX devices or systems 155 of system 100 of FIG. 1 and/or the user interface aspects 295 of system 200 of FIG. 2, or the like.

According to some embodiments, method 700, at optional block 735 may comprise tracking, using the computing system, the one or more surgical devices, using at least one of an electromagnetic-based tracking system, a magnetic anomaly detection-based tracking system, a radio frequency identification ("RFID")-based tracking system, a Bluetooth-based tracking system, a wireless-based tracking system, an optical-based tracking system, a laser-based tracking system, an ultrasound ("US") imaging-based tracking system, a computer vision-based tracking system, a fluoroscopy-based tracking system, an MRI-based tracking system, an accelerometer-based tracking system, a global positioning system ("GPS")-based tracking system, an infrared ("IR")-based tracking system, an ultrasonic sound-based tracking system, a piezoelectric-based tracking system, a simultaneous localization and mapping ("SLAM")-based tracking system, an acoustic-based tracking system, a radar-based tracking system, a feature identification-based tracking system, a machine learning-based tracking system, a predictive tracking system, a prescriptive tracking system, or a near-field communications-based tracking system, and/or the like.

Figure 7D:
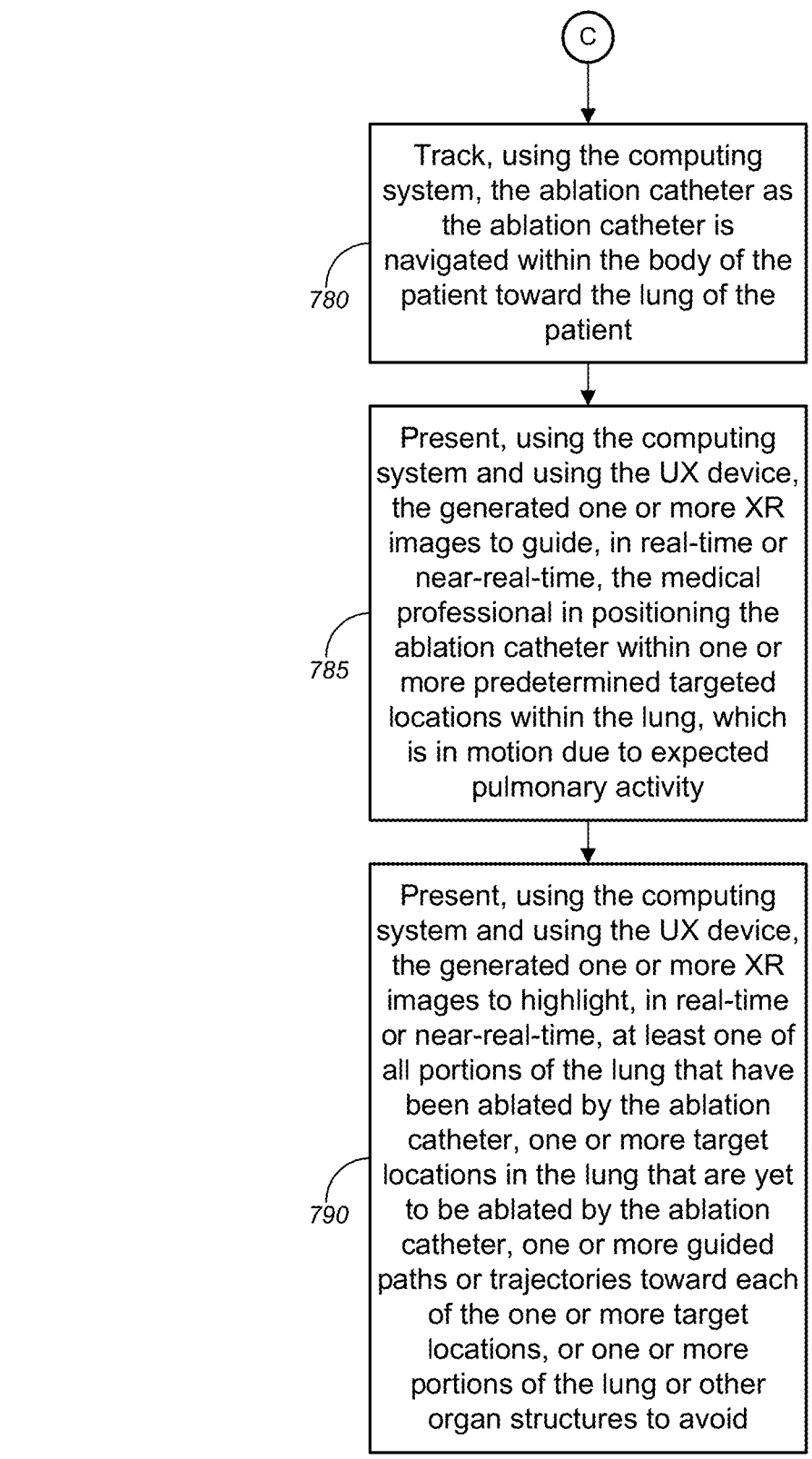

Method 700 may continue onto the process at block 740 in FIG. 7B following the circular marker denoted, "A," may continue onto the process at block 760 in FIG. 7C following the circular marker denoted, "B," and/or may continue onto the process at block 780 in FIG. 7D following the circular marker denoted, "C."

At block 740 in FIG. 7B (following the circular marker denoted, "A"), method 700 may comprise receiving, using the computing system, one or more control inputs from the medical professional. Method 700 may further comprise, at block 745, analyzing, using the computing system, the received one or more control inputs in conjunction with analysis of the received one or more first layer input data and the received one or more second layer input data. Method 700, at block 750, may comprise generating, using the computing system, one or more control instructions based at least in part on the analysis, the generated one or more control instructions taking into account movement including at least one of movement of the lung and surrounding tissue due to at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient, and/or the like. Method 700 may further comprise sending, using the computing system, the generated one or more control instructions to the robotic system to cause the robotic system to implement the pulmonary procedure within the lung of the patient (block 755).

Alternatively, or additionally, at block 760 in FIG. 7C (following the circular marker denoted, "B"), method 700 may comprise receiving, using the computing system, one or more control inputs from the medical professional, including hand-movement-based control inputs resulting from movement of one or more hands of the medical professional, or the like. Method 700 may further comprise, at block 765, determining whether the hand-movement-based control inputs comprise inputs indicative of excessive movement of at least one hand of the one or more hands of the medical professional. If so, method 700, at block 770, may comprise generating, using the computing system, one or more compensated control instructions that include control instructions that are based on hand-movement-based control inputs while dampening one or more particular control inputs that are based on excessive movement of the at least one hand of the medical professional. Method 700 may further comprise sending, using the computing system, the generated one or more control instructions to a robotic system to cause the robotic system to implement the pulmonary procedure within the lung of the patient (block 775).

Alternatively, or additionally, at block 780 in FIG. 7D (following the circular marker denoted, "C"), method 700 may comprise tracking, using the computing system, the one or more surgical devices (e.g., a ablation catheter, etc.), as the surgical device(s) (i.e., the ablation catheter, etc.) is navigated within the body of the patient toward the lung of the patient. Method 700 may further comprise, at block 785, presenting, using the computing system and using the UX device, the generated one or more XR images to guide, in real-time or near-real-time, the medical professional in positioning the ablation catheter within one or more predetermined targeted locations within the lung, which is in motion due to expected pulmonary activity. Method 700 may further comprise presenting, using the computing system and using the UX device, the generated one or more XR images to highlight, in real-time or near-real-time, at least one of all portions of the lung that have been ablated by the ablation catheter, one or more target locations in the lung that are yet to be ablated by the ablation catheter, one or more guided paths or trajectories toward each of the one or more target locations, or one or more portions of the lung or other organ structures to avoid (block 790). In some cases, navigating the ablation catheter within the body of the patient may be performed using one or more robotic systems controlled by one or more control inputs received from the medical professional via the computing system.

Exemplary System and Hardware Implementation

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of computer or hardware system (i.e., system hubs or computing systems 105a, 105b, and 205; mapping and navigation systems (e.g., electroanatomic mapping ("EAM") system, high-density mapping catheter, patient patches, navigation hardware and software, etc.) 115a, 115b, and 240; devices or equipment (e.g., robotics systems, surgical training simulator, electrosurgical generator, radiofrequency ("RF") ablation generator, cryoballoon or cryoablation catheter system, pulsed field ablation ("PFA") system, a microwave ("MW") ablation system, monitoring catheter, respiratory equipment, surgical tools, deflectable or steerable sheath, dilator, deployment device, steering subsystem, handled subsystem, pressure subsystem, guidewire, introducer sheath, respiratory and other surgical equipment, syringe and manifold system, etc.) 135, 135a, 135b, and 210; imaging systems (e.g., computed tomography ("CT") machine, electrophysiology ("EP") system, fluoroscopy system, etc.) 140 and 245; sensors (e.g., instrumentation, IoT sensors, biometrics system, electrogram ("EGM") or electrocardiogram ("ECG") system, camera control unit, monitor, monitoring catheter, etc.) 145 and 250; extended reality ("XR") platforms or hardware 150 and 260; user experience ("UX") devices 155 and 265; data analytics or artificial intelligence ("AI") systems 160a and 160b; anatomy or tool registration systems 165 and 220; cloud storage system 180; etc.), as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the computer or hardware system (i.e., system hubs or computing systems 105a, 105b, and 205; mapping and navigation systems 115a, 115b, and 240; devices or equipment 135, 135a, 135b, and 210; imaging systems 140 and 245; sensors 145 and 250; XR platforms or hardware 150 and 260; UX devices 155 and 265; data analytics or AI systems 160a and 160b; anatomy or tool registration systems 165 and 220; cloud storage system 180; etc.), described above with respect to FIGS. 1-7— is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and/or the like); one or more input devices 815, which can include, without limitation, a mouse, a keyboard, and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire, and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

As noted above, a set of embodiments comprises methods and systems for implementing medical assistance technologies, and, more particularly, to methods, systems, and apparatuses for implementing intelligent assistance ("IA") or extended intelligence ("EI") ecosystem, and even more particularly, to methods, systems, and apparatuses for implementing extended intelligence for pulmonary procedures. FIG. 9 illustrates a schematic diagram of a system 900 that can be used in accordance with one set of embodiments. The system 900 can include one or more user computers, user devices, or customer devices 905. A user computer, user device, or customer device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 905 can also have any of a variety of applications, including one or more applications configured to perform methods provided by various embodiments (as described above, for example), as well as one or more office applications, database client and/or server applications, and/or web browser applications. Alternatively, a user computer, user device, or customer device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers, user devices, or customer devices 905, any number of user computers, user devices, or customer devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 910 (similar to network(s) 175 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 905 and/or another server 915. In some embodiments, an application server can perform one or more of the processes for implementing medical assistance technologies, and, more particularly, to methods, systems, and apparatuses for implementing IA or EI ecosystem, and even more particularly, to methods, systems, and apparatuses for implementing extended intelligence for guiding the one or more surgical devices toward and within a lung of the patient to perform a pulmonary procedure, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer, user device, or customer device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920a-920n (collectively, "databases 920"). The location of each of the databases 920 is discretionary: merely by way of example, a database 920a might reside on a storage medium local to (and/or resident in) a server 915a (and/or a user computer, user device, or customer device 905). Alternatively, a database 920n can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise system hub or computing system 925a and corresponding database(s) 930 (similar to system hub or computing system 105a and 205, and corresponding database(s) 110a of FIGS. 1 and 2, or the like), mapping and navigation system 925b (similar to mapping and navigation system 115a and 240 of FIGS. 1 and 2, or the like), one or more healthcare professionals 935 (similar to healthcare professional(s) 125 of FIG. 1, or the like), a subject 940 (similar to subjects 130 and 230 of FIGS. 1 and 2, or the like), one or more devices or equipment 945 (similar to devices or equipment 135, 135a, 135b, and 210 of FIGS. 1 and 2, or the like), one or more imaging systems 950 (similar to imaging system(s) 140 of FIG. 1, or the like), one or more sensors 955 (similar to sensors 145 and 245 of FIGS. 1 and 2, or the like), an extended reality ("XR") platform or system 960 (similar to XR platform or systems 150 and 260 of FIGS. 1 and 2, or the like), a user experience ("UX") device 965 (similar to UX devices 155 and 265 of FIGS. 1 and 2, or the like), a data analytics or artificial intelligence ("AI") system 970 (similar to data analytics or AI system 160a of FIG. 1, or the like), and/or an anatomy or tool registration system 975 (similar to anatomy or tool registration systems 165 and 220 of FIGS. 1 and 2, or the like), and/or the like. In some instances, the system hub or computing system 925a and corresponding database(s) 930, the mapping and navigation system 925b, the one or more healthcare professional(s) 935, the subject 940, the one or more devices or equipment 945, the one or more imaging systems 950, the one or more sensors 955, the XR platform or system 960, the UX device 965, the data analytics or AI system 970, or the anatomy or tool registration system 975, and/or the like, together with the user devices 905a and 905b may be located or disposed within clinical environment 980. In some cases, the clinical environment 980 might include, but is not limited to, a clinic, a hospital, an operating room, an emergency room, a physician's office, or a laboratory, or the like.

In some embodiments, the system 900 might further comprise remote system hub or computing system 985a and corresponding database(s) 990a (similar to system hub or computing system 105b and corresponding database(s) 110b of FIG. 1, or the like), and remote mapping and navigation system 985b and corresponding database(s) 990b (similar to mapping and navigation system 115b and corresponding database(s) 120b of FIG. 1, or the like), or the like, that communicatively couple to the system hub or computing system 925a via network(s) 910.

In operation, system hub or computing system 925a or 985a (collectively, "computing system" or the like) might receive one or more first layer input data from one or more first devices, the one or more first layer input data comprising at least one of movement data, position data, relative distance data, or externally observable data for each of one or more persons (e.g., subject 940, healthcare professional(s) 935, etc.) and one or more objects (e.g., device(s) or equipment 945, furniture, etc.) within a room (i.e., clinical environment 980, or the like). In such cases, the one or more first devices may include at least one of imaging system(s) 950, sensor(s) 955, and/or the like, that are configured to obtain, capture, or otherwise provide the one or more first layer input data. The computing system might receive one or more second layer input data from one or more second devices, the one or more second layer input data comprising at least one of one or more patient sensor data for monitoring procedure-relevant aspects of a patient (i.e., subject 940), one or more patient imaging data for monitoring images of one or more portions of a body of the patient, or one or more navigation and mapping data for monitoring one or more surgical devices (i.e., the devices or equipment 945, or the like) relative to the one or more portions of the body of the patient, and/or the like. In such cases, the one or more second devices may include at least one of device(s) or equipment 945, imaging system(s) 950, sensor(s) 955, and/or the like, that are configured to obtain, capture, or otherwise provide the one or more second layer input data.

The computing system might analyze the received one or more first layer input data and the received one or more second layer input. The computing system might generate one or more recommendations for guiding a medical professional (i.e., healthcare professional(s) 935, or the like) in guiding the one or more surgical devices toward and within a lung of the patient to perform a pulmonary procedure, based at least in part on the analysis, the generated one or more recommendations comprising 3D or 4D mapped guides toward, in, and around the lung of the patient. The computing system might then generate one or more XR images (or one or more XR experiences), based at least in part on the generated one or more recommendations, and might present the generated one or more XR images (or one or more XR experiences) using a UX device 965. According to some embodiments, the one or more XR images might be dynamic images, which might include an overlay of data models depicting at least one of electrical pulses, blood flow, tissue movement, damage, stress, and/or the like, and thus may not be a still frame in 3D. In some embodiments, the one or more XR images might include, without limitation, at least one of one or more AR images, one or more AR videos, one or more VR images, one or more VR videos, one or more MR images, one or more MR videos, one or more XR images, or one or more XR videos, and/or the like.

According to some embodiments, the generated one or more XR images might be presented to provide one or more of: a guide for a medical professional (e.g., healthcare professional(s) 935, or the like), a navigation tool during the pulmonary procedure, a proximity detection tool during the pulmonary procedure, a 3D or 4D visualization view of the at least one or more portions of the patient, a heads-up display of at least one of the one or more first layer input data, a heads-up display of at least one of the one or more patient sensor data, a heads-up display of at least one of the one or more patient imaging data, a heads-up display of physiological data of the patient, or a heads-up display of procedure-related data of the patient, and/or the like. In some instances, generating the one or more XR images might comprise combining or mapping the received one or more first layer input data and the received one or more second layer input into a combined 3D or 4D representation, based at least in part on the analysis and the generated one or more recommendations; and generating the one or more XR images based on the combined 3D or 4D representation.

In some embodiments, the computing system might track the one or more surgical devices (e.g., devices or equipment 945, or the like), using at least one of an electromagnetic-based tracking system, a magnetic anomaly detection-based tracking system, a radio frequency identification ("RFID")-based tracking system, a Bluetooth-based tracking system, a wireless-based tracking system, an optical-based tracking system, a laser-based tracking system, an ultrasound ("US") imaging-based tracking system, a computer vision-based tracking system, a fluoroscopy-based tracking system, an MRI-based tracking system, an accelerometer-based tracking system, a global positioning system ("GPS")-based tracking system, an infrared ("IR")-based tracking system, an ultrasonic sound-based tracking system, a piezoelectric-based tracking system, a simultaneous localization and mapping ("SLAM")-based tracking system, an acoustic-based tracking system, a radar-based tracking system, a feature identification-based tracking system, a machine learning-based tracking system, a predictive tracking system, a prescriptive tracking system, or a near-field communications-based tracking system, and/or the like.

According to some embodiments, the computing system might receive one or more control inputs from the medical professional; might analyze the received one or more control inputs in conjunction with analysis of the received one or more first layer input data and the received one or more second layer input data; might generate one or more control instructions based at least in part on the analysis, the generated one or more control instructions taking into account movement including at least one of movement of the lung and surrounding tissue due to at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient, and/or the like; and might send the generated one or more control instructions to the robotic system (which may, in some cases, be included among the device(s) or equipment 945, or the like) to cause the robotic system to implement the pulmonary procedure within the lung of the patient.

In some instances, at least the processes of receiving the one or more first layer input data, receiving the one or more second layer input data, analyzing the received one or more first layer input data and the received one or more second layer input, generating the one or more recommendations, generating the one or more XR images, presenting the generated one or more XR images, receiving the one or more control inputs, analyzing the received one or more control inputs, generating the one or more control instructions, and/or sending the generated one or more control instructions may occur in a manner that is at least one of continual, dynamic, feedback-looped, updated, in real-time, or in near-real-time, and/or the like, during the course of the pulmonary procedure. According to some embodiments, real-time display of simulations and interactions in XR for one or more of statistical shape modeling ("SSM") of anatomy, finite element analysis ("FEA"), electrical wave propagation, computation fluid dynamics, and/or the like (collectively, "analytical tools" or the like), may be coupled with XR and AI to aid in the placement of a heart valve where flow could be predicted (or, in the case of a lead or ablation, where the wave propagation could be simulated) and displayed before the final placement, or the like.

In some embodiments, the received one or more control inputs may comprise hand-movement-based control inputs resulting from movement of one or more hands of the medical professional. In such cases, analyzing the received one or more control inputs may comprise determining whether the hand-movement-based control inputs comprise inputs indicative of excessive movement of at least one hand of the one or more hands of the medical professional. As such, generating the one or more control instructions may comprise, based on a determination that the hand-movement-based control inputs comprise inputs indicative of excessive movement of at least one hand of the medical professional, the computing system generating one or more compensated control instructions that include control instructions that are based on hand-movement-based control inputs while dampening one or more particular control inputs that are based on excessive movement of the at least one hand of the medical professional.

These and other functions of the system 900 (and its components) are described in greater detail above with respect to FIGS. 1-7.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

What is claimed is:

1. A method, comprising:
receiving, using a computing system, first layer input data for an artificial intelligence algorithm from one or more first devices, the one or more first layer input data comprising at least one of movement data, position data, relative distance data, or externally observable data for each of one or more persons and one or more objects within a room;
receiving, using the computing system, second layer input data for the artificial intelligence algorithm from one or more second devices, the second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient, the patient being within the room, the one or more surgical devices including at least one selected from the group consisting of a cryoballoon, a cryoablation catheter, and a cryoablation console;
analyzing, using the computing system, the received first layer input data and the received second layer input data based on the artificial intelligence algorithm;
generating, using the computing system, one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient;
generating, using the computing system, one or more extended reality ("XR") images, based at least in part on the generated one or more recommendations, wherein generating one or more extended reality images further includes imaging of the cryoballoon in real time to visualize an ice growth for cryoablation; and
presenting, using the computing system and using a user experience ("UX") device, the generated one or more XR images.

2. The method of claim 1, wherein the computing system comprises at least one of an XR computing system, a medical procedure computing system, a hub computing system, a 3D graphical processing unit, a cluster computing system, a 4D graphics computing system, a server computer, a cloud computing system, or a distributed computing system.

3. The method of claim 1, wherein the one or more surgical devices comprise at least one of one or more catheters, one or more catheter interconnect cables, one or more balloons, one or more rigid robotic devices, one or more soft robotic devices, one or more robotic systems, one or more robotic arms, one or more needles, one or more therapeutic delivery devices, one or more diagnostic devices, one or more diagnostic catheters, one or more bronchoscopes, one or more surgical tools, one or more drug pumps, one or more delivery pharmaceuticals, one or more biopsy tools, one or more excision tools, one or more ablation tools, one or more monitoring devices, one or more cameras, one or more imaging tools, one or more fiducials, one or more staples, one or more anchors, one or more lasers, one or more guide wires, one or more introducers, one or more sheaths, one or more pillcams, one or more clips, one or more capsules, one or more energy delivery tools, a catheter electrode distribution system ("CEDS"), a pulsed field ablation ("PFA") system, a PFA console, an electroporation system, an electroporation control console, a radio frequency ("RF") ablation-based system, an RF ablation control console, a laser ablation-based system, a laser ablation control console, a radiation ablation-based system, a radiation ablation control console, a microwave ablation-based system, a chemical ablation-based system, a loop catheter, a hoop catheter, a circular catheter, an RF catheter, a phased RF catheter, a high intensity focused ultrasound ("HIFU") system, a HIFU control console, or one or more capital equipment.

4. The method of claim 1, wherein the one or more patient sensor data are obtained using one or more sensors comprising at least one of one or more chronically implanted sensors, one or more diagnostic sensors, one or more surgical sensors, one or more wearable sensors, one or more gas sensors, one or more optical sensors, one or more impedance sensors, one or more ultrasound sensors, one or more flow sensors, one or more blood velocity sensors, one or more blood volume sensors, one or more motion sensors, one or more sound sensors, one or more blood pressure sensors, one or more heart rate sensors, one or more pulse sensors, one or more oxygen sensors, one or more pulse oximetry sensors, one or more carbon dioxide ("$CO_2$") sensors, one or more fluid levels, one or more lung volume sensors, one or more respiration rate sensors, one or more tidal volume sensors, one or more lung filling pressure sensors, one or more piezoelectric sensors, one or more accelerometers, one or more image sensors, one or more acoustic sensors, one or more temperature sensors, one or more ambulatory activity monitoring sensors, one or more patient weight sensors, one or more patient mattress sensors, one or more doppler sensors, one or more biomarker sensors, one or more perfusion sensors, one or more electromyography ("EMG") sensors, one or more electrocardiogramsors, one or more sleep sensors, one or more hematocrit ("HCT") level sensors, one or more biometric sensors, one or more electroencephalographic ("EEG") sensors, one or more apnea monitoring sensors, one or more dyspnea monitoring sensors, one or more nociception monitoring sensors, or one or more pain sensors.

5. The method of claim 1, wherein the one or more patient imaging data are obtained using one or more imaging devices comprising at least one of a magnetic resonance imaging ("MM") system, a diffusion-tensor imaging ("DTI") system, a computed tomography ("CT") system, an ultrasound ("US") system, a transesophageal echocardiography ("TEE") system, an intra-cardiac echocardiography ("ICE") system, a transthoracic echocardiography ("TTE") system, an intravascular ultrasound ("IVUS") system, an electromechanical wave imaging ("EWI") system, a single photon emission computed tomography ("SPECT") system, a magnetic resonance angiography ("MRA") system, a computed tomography angiography ("CTA") system, a blood oxygen-level dependent signal ("BOLD") system, an arterial spin labeling ("ASL") system, a positron emission tomography ("PET") system, an optical coherence tomography ("OCT") system, an optical imaging spectroscopy ("OIS") system, a magnetic resonance spectroscopy ("MRS") system, a dynamic susceptibility contrast ("DSC") MRI system, a fluid-attenuated inversion recovery ("FLAIR") system, a fluoroscopy system, an X-ray system, a 3D scanning system, an infrared ("IR") system, an ultraviolet ("UV") system, a bioluminescent system, an endoscopy system, a triboluminescence system, an image fusion system, or a microscope.

6. The method of claim 1, wherein the pulmonary procedure comprises at least one of a bronchoscopy procedure, a lung tissue denervation procedure, a lung tissue biopsy procedure, a chronic obstructive pulmonary disease ("COPD") diagnosis procedure, a dyspnea diagnosis procedure, a pneumonia diagnosis procedure, an asthma diagnosis procedure, a long-term corona virus diagnosis procedure, an anaphylactic response diagnosis procedure, a bronchitis diagnosis procedure, a lung cancer diagnosis procedure, a COPD treatment procedure, a dyspnea treatment procedure, a pneumonia treatment procedure, an asthma treatment procedure, a long-term corona virus treatment procedure, an anaphylactic response treatment procedure, a bronchitis treatment procedure, or a lung cancer treatment procedure.

7. The method of claim 1, wherein the one or more XR images comprise at least one of one or more augmented reality ("AR") images, one or more AR videos, one or more virtual reality ("VR") images, one or more VR videos, one or more mixed reality ("MR") images, one or more MR videos, one or more XR images, or one or more XR videos.

8. The method of claim 1, wherein the UX device comprises at least one of a headset, UX glasses, a viewing window, a supplement to existing glasses, headphones, UX contact lenses, a heads-up display ("HUD") device, a 3D spatial sound system, a telemonitoring system, a rigid robotic device control and sensory feedback system, a soft robotic device control and sensory feedback system, an eye control system, a voice control system, a remote control system, a gesture-based control system, a sign language-based control system, a body-part-based control system, a joystick, a mouse, a two-dimensional ("2D") screen display, a 3D refractive display, a parallel reality system, a projection system, a 3D printed reconstruction system, a customized view generation system, a ghosting and prediction system, a master-slave control system, an annotation system, or a haptic feedback system.

9. The method of claim 1, wherein the generated one or more XR images are presented to provide one or more of: a guide for the medical professional, a navigation tool during the pulmonary procedure, a proximity detection tool during the pulmonary procedure, a 3D or 4D visualization view of the at least one or more portions of the patient, a heads-up display of first layer input data, a heads-up display of at least one of the one or more patient sensor data, a heads-up display of at least one of the one or more patient imaging data, a heads-up display of physiological data of the patient, or a heads-up display of procedure-related data of the patient.

10. The method of claim 1, further comprising:
tracking, using the computing system, the one or more surgical devices, using at least one of an electromagnetic-based tracking system, a magnetic anomaly detection-based tracking system, a radio frequency identification ("RFID")-based tracking system, a Bluetooth-based tracking system, a wireless-based tracking system, an optical-based tracking system, a laser-based tracking system, an ultrasound ("US") imaging-based tracking system, a computer vision-based tracking system, a fluoroscopy-based tracking system, an MRI-based tracking system, an accelerometer-based tracking system, a global positioning system ("GPS")-based tracking system, an infrared ("IR")-based tracking system, an ultrasonic sound-based tracking system, a piezoelectric-based tracking system, a simultaneous localization and mapping ("SLAM")-based tracking system, an acoustic-based tracking system, a radar-based tracking system, a feature identification-based tracking system, a machine learning-based tracking system, a predictive tracking system, a prescriptive tracking system, or a near-field communications-based tracking system.

11. The method of claim 1, further comprising:
receiving, using the computing system, one or more control inputs from the medical professional;
analyzing, using the computing system, the received one or more control inputs in conjunction with analysis of the received first layer input data and the received second layer input data based on the artificial intelligence algorithm;
generating, using the computing system, one or more control instructions based at least in part on the analysis, the generated one or more control instructions taking into account movement including at least one of movement of the lung and surrounding tissue due to at least one of continual contraction and expansion of the lung, respiration of the patient, beating of the patient's heart, changes in posture of the body of the patient, movement of the body of the patient due to effects of anesthesia, tissue distortion due to a robotic system and a flexible bronchoscope, table movement, fluid loss, changes in posture of the body of the patient, or other movement or shifting of at least one portion of the body of the patient; and
sending, using the computing system, the generated one or more control instructions to the robotic system to cause the robotic system to implement the pulmonary procedure within the lung of the patient.

12. The method of claim 11, wherein at least the processes of receiving the first layer input data, receiving the second layer input data, analyzing the received first layer input data and the received second layer input data, generating the one or more recommendations, generating the one or more XR images, presenting the generated one or more XR images, receiving the one or more control inputs, analyzing the received one or more control inputs, generating the one or more control instructions, and sending the generated one or more control instructions occur in a manner that is at least one of continual, dynamic, feedback-looped, updated, in real-time, or in near-real-time during the course of the pulmonary procedure.

13. The method of claim 11, wherein the received one or more control inputs comprise hand-movement-based control inputs resulting from movement of one or more hands of the medical professional, wherein analyzing the received one or more control inputs comprises determining whether the hand-movement-based control inputs comprise inputs indicative of excessive movement of at least one hand of the one or more hands of the medical professional, and wherein generating the one or more control instructions comprises, based on a determination that the hand-movement-based control inputs comprise inputs indicative of excessive movement of at least one hand of the medical professional, generating, using the computing system, one or more compensated control instructions that include control instructions that are based on hand-movement-based control inputs while dampening one or more particular control inputs that are based on excessive movement of the at least one hand of the medical professional.

14. The method of claim 1, wherein the method is performed without use of fluoroscopy.

15. The method of claim 1, wherein the one or more surgical devices comprise an ablation catheter, wherein the method further comprises:
tracking, using the computing system, the ablation catheter as the ablation catheter is navigated within the body of the patient toward the lung of the patient;
presenting, using the computing system and using the UX device, the generated one or more XR images to guide, in real-time or near-real-time, the medical professional in positioning the ablation catheter within one or more predetermined targeted locations within the lung, which is in motion due to expected pulmonary activity; and
presenting, using the computing system and using the UX device, the generated one or more XR images to highlight, in real-time or near-real-time, at least one of all portions of the lung that have been ablated by the ablation catheter, one or more target locations in the lung that are yet to be ablated by the ablation catheter, one or more guided paths or trajectories toward each of the one or more target locations, or one or more portions of the lung or other organ structures to avoid.

16. The method of claim 15, wherein navigating the ablation catheter within the body of the patient is performed using one or more robotic systems controlled by one or more control inputs received from the medical professional via the computing system.

17. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive first layer input data for an artificial intelligence algorithm from one or more first devices, the first layer input data comprising at least one of movement data, position data, relative distance data, or externally observable data for each of one or more persons and one or more objects within a room;
receive second layer input data for the artificial intelligence algorithm from one or more second devices, the second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient, the patient being within the room, the one or more surgical devices including at least one selected from the group consisting of a cryoballoon, a cryoablation catheter, and a cryoablation console;
analyze the received first layer input data and the received second layer input data based on the artificial intelligence algorithm;
generate one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient;

generate one or more extended reality ("XR") images, based at least in part on the generated one or more recommendations, wherein generating one or more extended reality images further includes imaging of the cryoballoon in real time to visualize an ice growth for cryoablation; and present, using a user experience ("UX") device, the generated one or more XR images.

18. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive first layer input data for an artificial intelligence algorithm from one or more first devices, the first layer input data comprising at least one of movement data, position data, relative distance data, or externally observable data for each of one or more persons and one or more objects within a room;

receive second layer input data for an artificial intelligence algorithm from one or more second devices, the second layer input data comprising at least one of one or more patient sensor data for monitoring procedure-relevant aspects of a patient, one or more patient imaging data for monitoring images of one or more portions of a body of the patient, or one or more navigation and mapping data for monitoring one or more surgical devices relative to the one or more portions of the body of the patient, the one or more surgical devices including at least one selected from the group consisting of a cryoballoon, a cryoablation catheter, and a cryoablation console;

analyze the received first layer input data and the received second layer input data based on the artificial intelligence algorithm;

generate one or more recommendations for guiding a medical professional in guiding the one or more surgical devices toward and within a lung of the patient to perform a pulmonary procedure, based at least in part on the analysis, the generated one or more recommendations comprising three-dimensional ("3D") or four-dimensional ("4D") mapped guides toward, in, and around the lung of the patient;

generate one or more extended reality ("XR") images, based at least in part on the generated one or more recommendations, wherein generating one or more extended reality images further includes imaging of the cryoballoon in real time to visualize an ice growth for cryoablation; and present, using a user experience ("UX") device, the generated one or more XR images.

* * * * *